United States Patent [19]

Morisawa

[11] Patent Number: 4,871,344
[45] Date of Patent: Oct. 3, 1989

[54] POWER TRANSMISSION CHAIN BELT

[75] Inventor: Kunio Morisawa, Toyota, Japan

[73] Assignee: Toyota Jidosha Kabushiki Kaisha, Aichi, Japan

[21] Appl. No.: 246,671

[22] Filed: Sep. 19, 1988

[30] Foreign Application Priority Data

| Sep. 24, 1987 | [JP] | Japan | 62-239497 |
| Sep. 24, 1987 | [JP] | Japan | 62-239498 |
| Sep. 24, 1987 | [JP] | Japan | 62-239499 |
| Apr. 15, 1988 | [JP] | Japan | 63-94066 |
| Apr. 15, 1988 | [JP] | Japan | 63-94067 |

[51] Int. Cl.$^4$ .......................................... F16G 13/06
[52] U.S. Cl. .................................. 474/206; 474/212; 474/215
[58] Field of Search ................ 474/212–217, 474/206; 59/88, 84

[56] References Cited

U.S. PATENT DOCUMENTS

| 1,534,494 | 4/1925 | Belcher | 474/216 |
| 1,692,799 | 11/1928 | Sturtevant | 474/215 |
| 1,822,749 | 9/1931 | Rothman | 474/215 |
| 1,849,684 | 3/1932 | Morse | 474/215 X |
| 3,049,933 | 2/1959 | Besel et al. | 474/8 |
| 4,344,761 | 8/1982 | Steuer | 474/245 |
| 4,516,963 | 5/1985 | Mott | 474/245 |
| 4,516,964 | 5/1985 | Laster | 474/245 |
| 4,516,965 | 5/1985 | Mott | 474/245 |
| 4,622,025 | 11/1986 | Kern et al. | 474/245 |
| 4,737,137 | 4/1988 | Miyaishi | 474/245 |

FOREIGN PATENT DOCUMENTS

| 0109202 | 5/1984 | European Pat. Off. . |
| 0194037 | 10/1986 | European Pat. Off. . |
| 14807 | 6/1920 | Japan . |
| 40013929 | 5/1940 | Japan . |
| 99142 | 6/1984 | Japan . |
| 130644 | 6/1986 | Japan . |
| 2197421 | 5/1988 | United Kingdom . |

Primary Examiner—Thuy M. Bui
Attorney, Agent, or Firm—Oliff & Berridge

[57] ABSTRACT

A power transmission endless chain belt connecting two pulleys, including a belt body having multiple sets of link plates each set consisting of a plurality of parallel link plates, each of which has a pair of pin holes. The belt body further has multiple pins inserted into the pin holes such that the link plates of one set are pivotally connected to the link plates of the adjacent sets. The chain belt further includes multiple pairs of blocks each pair having opposed mutually rolling surfaces, each pair of blocks having an aperture through which the link plates of the corresponding set extend. The pins define first bending points of the belt. One of the pin holes formed in each link plate has a larger size than the other pin hole, and cooperates with the corresponding pin, to define a clearance therebetween. The link plates of each set are arranged such that each pin extends through one of the pair of pin holes in at least one of the link plates of each set, and the other of the pair of pin holes in the remainder of the link plates of the same set. The rolling surfaces of the multiple pairs of blocks define second bending points of the belt. Each second bending point is located between adjacent ones of the first bending points, whereby a bending pitch of the belt is equal to a distance between the adjacent first and second bending points.

24 Claims, 28 Drawing Sheets

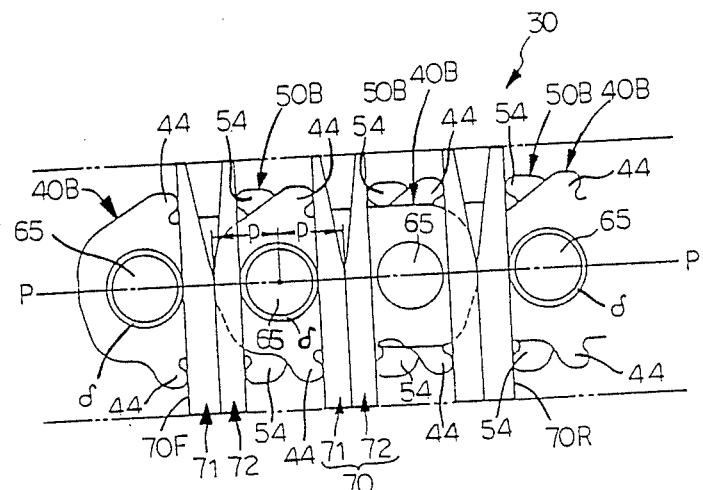
FIG. 18
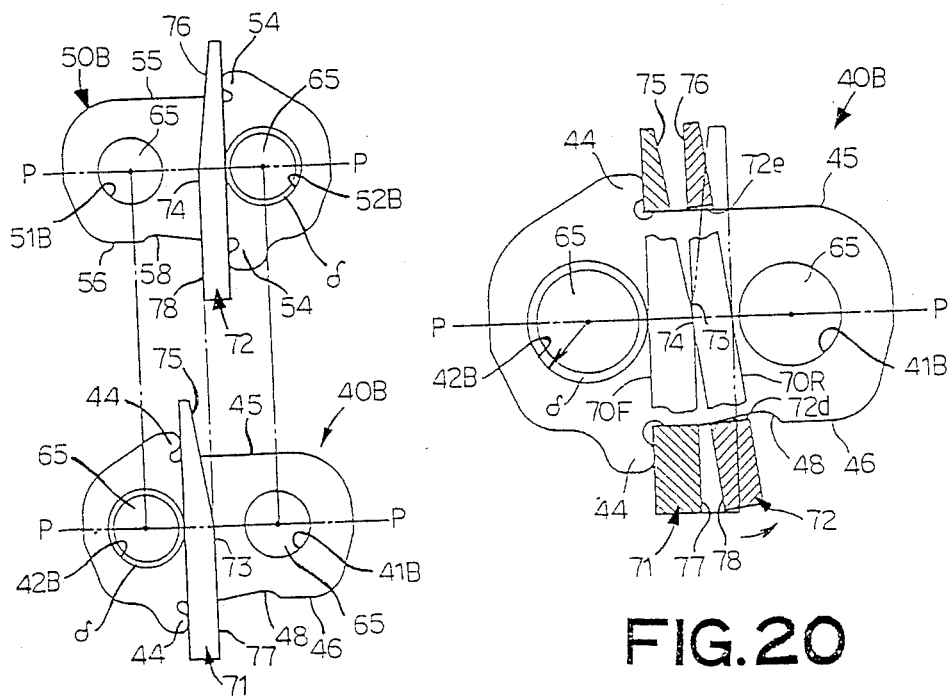
FIG. 19
FIG. 20

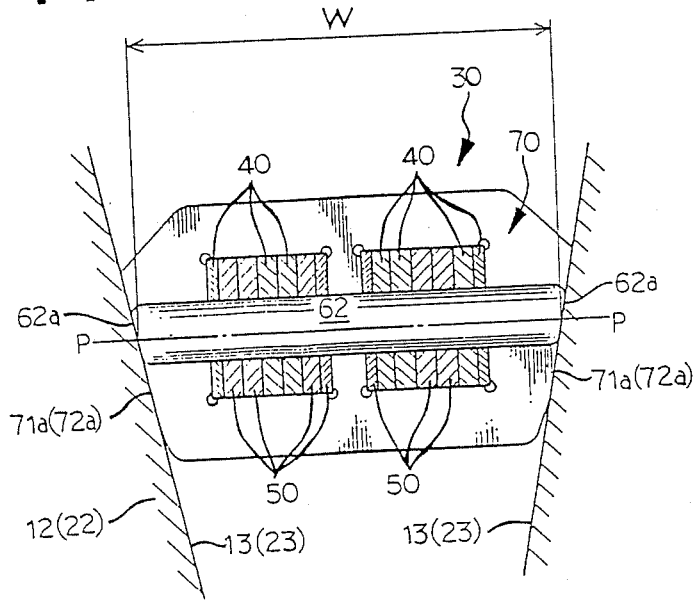
FIG.30
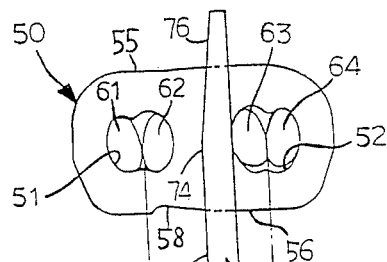
FIG.31
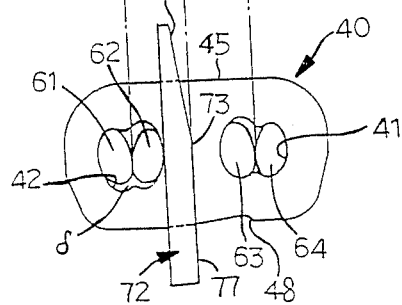

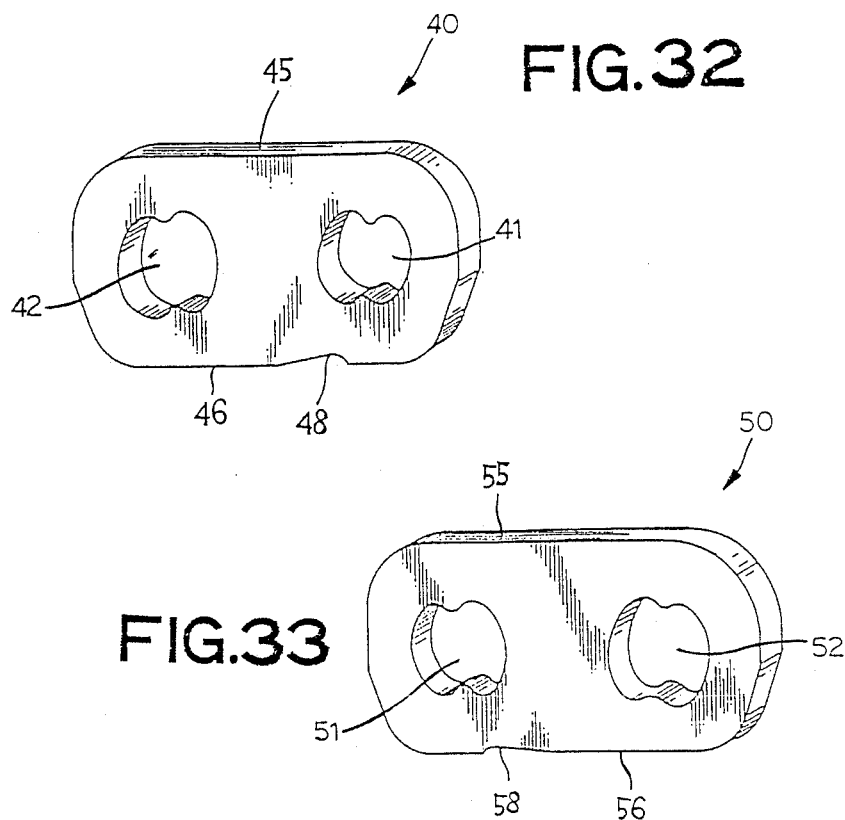
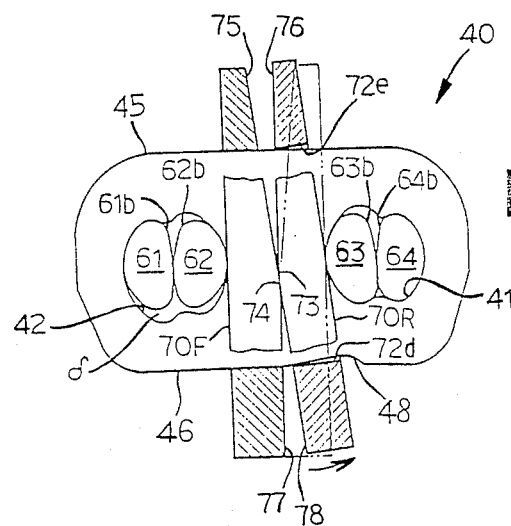

POWER TRANSMISSION CHAIN BELT

BACKGROUND OF THE INVENTION

1. Field of the Invention

The present invention relates to a power transmission chain belt which connects two pulleys to transmit motion and power from one of the pulleys to the other.

2. Discussion of the Related Art

In recent years, substantial studies have been conducted to develop a belt-and-pulley type continuously variable transmission for a motor vehicle. This type of continuously variable transmission is provided with a pair of variable-diameter pulleys, each of which has a V-shaped circumferential groove whose width is variable to change an effective diameter of the pulley. These pulleys are connected by a transmission belt to transmit power therebetween. The speed ratio of the transmission is varied as the effective diameters of the pulleys are changed.

As a transmission belt used for the belt-and-pulley type continuously variable transmission of the type indicated above, there is known an endless chain belt which includes multiple sets of link plates connected in a loop by pins, each set consisting of a plurality of link plates which extend through an aperture formed in a block which is adapted to be in pressed contact with the pulleys. An example of such a chain belt is disclosed in laid-open Publication No. 40-13929 of examined Japanese Utility Model Application. This chain belt is shown in FIGS. 22-25, wherein the chain belt generally indicated at 3 consists of a plurality of link plates 4, 5, pins 6 and blocks 7. As depicted in FIG. 25, each link plate 4, 5 has pin holes 4a, 4a (5a, 5a) formed through its opposite end portions. The link plate 4, 5 has a pair of tabs 4c (5c) formed at one of the opposite end portions. Each tab 4c (5c) defines a shoulder 4b (5b). The pins 6 extend through the pin holes 4a, 5a of the link plates 4, 5 over a suitable distance such that the ends of the pins do not contact the opposed surfaces of the V-groove of the pulley. The pins 6 connect the individual link plates 4, 5, such that the link plates are pivotable about the pins. As indicated in FIG. 24, each block 7 has opposed angled surfaces 7a, 7a frictionally engageable with the opposed surfaces of the V-grooves of the pulley, and a central aperture 7b. The link plates 4 and 5 are inserted through the central aperture 7b of the appropriate block 7 in the opposite directions, alternately, such that the shoulders 4b, 5b of the tabs 4c, 5c of the link plates 4, 5 are held in abutting contact with front and rear surfaces 7F, 7R of the block 7, as depicted in FIG. 23. In this condition, the pins 6 are inserted through the pin holes 4a, 5a of the link plates 4, 5. Thus, the multiple sets of the link plates 4, 5 are connected into the endless chain belt 3, such that the pins 6 are held away from the front and rear surfaces 7F, 7R of the blocks 7, by the tabs 4c, 5c.

When the known chain belt of the type described above is installed in engagement with the circumferential grooves of the pulleys, the pins 6 are disposed along a part of each pulley such that the axes of the pins 6 define a part of a polygon. Consequently, the chain belt suffers from a variation in its tension, as indicated in FIG. 27. Described more specifically referring to FIG. 26, upon rotation of the input or drive pulley 1, a tension T1 of the slack side of the belt and a tension T2 of the tensile side vary as indicated in FIG. 27. Accordingly, a varying total amount of the tensile forces T1 and T2 of the belt is imparted to the shafts which support the pulleys. As a result, a support structure for supporting a transaxle case is oscillated, and the entire transaxle assembly is vibrated, causing noises to be heard within the interior of the vehicle.

If the length of each side of the polygon partially defined by the axes of the pins 6 disposed around the pulley is shortened, masses of the end portions of the link plates 4, 5 which define the pin holes 4a, 5a should be reduced to avoid an interference with the blocks 7, whereby the strength of the link plates 4, 5 is decreased. On the other hand, the chain belt tends to be large-sized if designed to provide a sufficient strength while using the link plates 4, 5 which have a relatively small distance between the pin holes 4a, 5a. This is undesirable for a continuously variable transmission for a motor vehicle, on which a space available for the chain belt is relatively limited. Due to the above inconveniences, it has been impossible to shorten the bending pitch of the chain belt (spacing between the adjacent pins 6) to an extent to sufficiently reduce the noises which occur due to the varying amount of tension of the chain belt of the transmission.

SUMMARY OF THE INVENTION

The present invention was developed in view of the prior art situations described above. It is therefore an object of the present invention to provide a power transmission chain belt which is relatively small in size and which has a comparatively small bending pitch to reduce noises due to a varying amount of tension thereof.

The above object may be accomplished according to the principle of the present invention, which provides a power transmission endless chain belt connecting a pair of pulleys each having an outer groove, comprising: (a) an endless belt body including multiple sets of link plates each set consisting of a plurality of link plates which are arranged in parallel with each other in a transverse direction perpendicular to a rotating direction of the chain belt, each of the plurality of link plates of each set having a pair of pin holes, the belt body further including a multiplicity of pins which are inserted into the pin holes of the multiple sets of link plates such that the link plates of one set are pivotally connected to the link plates of the adjacent sets, whereby the multiple sets of link plates are flexibly looped in the rotating direction; and (b) multiple pairs of blocks each pair having opposed mutually rolling surfaces, each of the pair of blocks having an aperture through which the link plates of a corresponding one of the multiple sets extend. The multiplicity of pins constitute first pivot means which define a plurality of first bending points of the chain belt. One of the pair of pin holes formed in each link plate has a larger size than the other pin hole, and cooperates with the corresponding one of the multiplicity of pins, to define a clearance therebetween. The link plates of each set are arranged such that each of the multiplicity of pins extends through the above-indicated one of the pair of pin holes in at least one of the link plates of each set, and the other of the pair of pin holes in the remainder of the link plates of each set. The multiple pairs of blocks constitute second pivot means such that the opposed mutually rolling surfaces define a plurality of second bending points of the chain belt. Each of the second bending points is located between adjacent ones of the first bending points, whereby a bending pitch of the chain belt is equal to a distance between the adjacent first and second bending points.

In operation of the chain belt of the present invention constructed as described above, power transmitted from one of the pulleys to the pairs of blocks which engage the outer groove of that one pulley is transmitted to the other pulley, via the chain body, more precisely, via the pairs of blocks which frictionally contact the outer groove of that other pulley. The instant chain belt can be bent, not only at the first bending points of the first pivot means which are constituted by the connecting pins which pivotally connect the adjacent sets of link plates, but also at the second bending points of the second pivot means which are constituted by the multiple pairs of blocks which are located between the adjacent pins. Accordingly, the bending pitch of the chain belt is reduced to a half of that of the known chain belt wherein the blocks do not provide bending points. As a result, the noises due to the variation in the tension of the instant chain belt can be effectively reduced, without increasing the size of the belt.

Described more specifically, one of the pair of pin holes formed in each link plate has a larger size than the other pin hole, whereby a suitable clearance is left between the inner surface of the above-indicated one pin hole and the outer circumference of the corresponding pin. Further, the link plates of each set are arranged such that each of the pins extends through the above-indicated one pin hole formed in at least one of the link plates of that set, and also the above-indicated other pin hole formed in the other link plate or plates of the same set. Since each pair of blocks has mutually rolling surfaces, the point of rolling contact of these rolling surfaces of each pair of blocks provides a second bending point between the two adjacent first bending points. Therefore, the bending pitch is equal to the distance between each first pivot means and the adjacent second pivot means, i.e., between the adjacent first and second bending points.

According to one advantageous feature of the present invention, each link plate has a recess formed in an inner surface thereof on an inner side of the endless belt body, such that the recess permits one of the corresponding pair of blocks to be inclined in a plane perpendicular to a plane of the blocks when the corresponding pair of blocks engage the outer grooves of the pair of pulleys.

According to another advantageous feature of the present invention, the multiplicity of pins consist of multiple pairs of rocker pins. Each pair of rocker pins has mutually rolling surfaces. In this case, radii of curvature of the opposed mutually rolling surfaces of each pair of blocks are equal to radii of curvature of the mutually rolling surfaces of the each pair of rocker pins.

Alternatively, the multiplicity of pins consist of roller pins.

According to a further advantageous feature of the present invention, the length of each of the multiplicity of pins is determined such that opposite ends of the pins are engageable with opposed inner surfaces of the outer grooves of the pulleys. The opposed ends are formed into a part-spherical shape.

According to a still further advantageous feature of the invention, at least one of each pair of blocks has a tapered surface which extends from the corresponding one of the mutually rolling surfaces outwardly of the endless belt body, and a vertical surface which extends from the corresponding rolling surface inwardly of the endless belt body. The vertical surface extend perpendicularly to the rotating direction of the belt. In this case, both of each pair of block may have the vertical surfaces, which are held in contact with each other while the blocks are located in a straight segment of the chain belt. The angles of the tapered surfaces may be determined such that the tapered surfaces do not contact with each other even when a portion of the chain belt which includes the relevant pair of blocks is curved along the pulleys, with a minimum radius of curvature of the chain belt.

According to a yet further advantageous feature of the invention, the opposed mutually rolling surfaces of the each pair of blocks have radii of curvature located on a pitch line of the chain belt which is defined by the first and second pluralities of bending points.

In accordance with another advantageous feature of the invention, each of each pair of blocks includes a partition wall formed in a longitudinally intermediate portion thereof such that the aperture is divided into two apertures which are spaced apart from each other in a longitudinal direction of each block parallel to the transverse direction of the chain belt. Each set of link plates consists of two groups each consisting of an odd number of link plates. One of the link plates of each group which is adjacent to the partition wall, and an outermost one of the link plates of the same group have a thickness which is equal to a half of that of the remainder of the link plates of that group.

In accordance with a further advantageous feature of the invention, each of the link plates of each set has a tab formed at one of opposite longitudinal end portions thereof. The link plates of each set extend through the aperture of the corresponding pair of blocks, alternately in opposite directions parallel to the rotating direction of the chain belt, such that the corresponding pair of blocks are sandwiched by and between the tabs of the link plates of the each set, so as to hold the corresponding pair of blocks spaced away from the corresponding pins. In this case, an inner surface of one of the pair of pin holes which is formed nearer to the tab may be either in contact with the corresponding pin, or spaced away from the corresponding pin, while the chain belt is transmission power between the pair of pulleys.

According to a still further advantageous feature of the instant invention, each pair of blocks corresponding to the each set of link plates are held in contact with and between the pins which extend through the pair of pin holes formed in the link plates of each set. In this instance, an inner surface of one of the pair of pin holes is either in contact with the corresponding pin, or spaced away from the corresponding pin, while the chain belt is transmitting power between the pair of pulleys.

According to a yet further advantageous feature of the present invention, each of the link plates of each set has a tab formed at one of opposite longitudinal end portions thereof. The pair of blocks corresponding to the each set of link plates are sandwiched by and between the tabs of the link plates such that the pins which extend through the apertures in each set of link plates are abuttable on the pair of blocks. In this instance, an inner surface of one of the pair of pin holes which is nearer to the tab is either in contact with the corresponding pin, or spaced away from the corresponding pin, while the chain belt is transmitting power between the pair of pulleys.

In accordance with still another advantageous feature of the invention, some of the multiplicity of pins and/or some of the blocks of the multiple pairs of blocks are selected at random as special pins and/or special blocks, over an entire length of the chain belt. The special pins and/or the special blocks have lengths which are smaller than those of the remainder of the multiplicity of pins and the remainder of the multiple pairs of blocks. In this arrangement, the peak of the noises having a given frequency of the chain belt can be effectively reduced.

According to yet another feature of the invention, some of the pin holes of the multiple sets of link plates are selected at random as special pin holes, over an entire length of the chain belt. The special pin holes have a clearance with respect to the corresponding pins. The clearance of the special pin holes are different from that of the remainder of the pin holes of the multiple sets of link plates. In addition to or in place of the above arrangement, the chain belt may include an arrangement wherein each pair of blocks has a tapered surface, and wherein some of the multiple pairs of blocks are selected at random as special pairs of blocks, over an entire length of the chain belt. An angle of the tapered surface of the special pairs of blocks is different from that of the remainder of the multiple pairs of blocks. These arrangement are also effective to reduce the peak of the noises of the chain belt.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which:

FIGS. 1–10 are views relating to a first embodiment of a chain belt of the present invention, wherein FIG. 1 is a side elevational view of a portion of the chain belt;

FIG. 2 is a plan view of the chain belt;

FIG. 3 is an elevational view in cross section taken along lines III—III of FIG. 1;

FIG. 4 is an exploded view explaining an assembling procedure of the chain belt;

FIG. 5 is an enlarged perspective view of a link plate used in the chain belt;

FIG. 6 is an enlarged perspective view of another link plate of the chain belt;

FIG. 7 is an enlarged perspective view of a block used in the chain block;

FIG. 8 is a side elevational view of the block;

FIG. 9 is a view showing the chain belt, when installed in engagement with a pulley;

FIG. 10 is an elevational view partly in cross section, illustrating a positional relation between the link plate and the blocks of the chain belt engaging the pulley;

FIG. 12 is a plan view of the chain belt of FIG. 11;

FIG. 13 is an elevational view in cross section taken along lines XIII—XIII of FIG. 11;

FIG. 14 is an exploded view explaining an assembling procedure of the chain belt of FIG. 11;

FIG. 15 is an enlarged perspective view of a link plate of the chain belt of FIG. 11;

FIG. 16 is an enlarged perspective view of another link plate of the chain belt of FIG. 11;

FIG. 17 is an elevational view partly in cross section corresponding to that of FIG. 10, showing a portion of the chain belt of FIG. 11;

FIGS. 18–20 relate to a third embodiment of the invention, wherein

FIG. 18 is a side elevational view of a portion of a chain belt of the third embodiment;

FIG. 19 is an exploded view explaining an assembling procedure of the chain belt of FIG. 18;

FIG. 20 is an elevational view partly in cross section corresponding to that of FIG. 10;

FIGS. 22–25 are views showing a known chain belt, wherein

FIG. 22 is a plan view of the known chain belt;

FIG. 23 is an elevational view in cross section taken along line XXIII—XXIII of FIG. 22;

FIG. 24 is an elevational view in cross section taken along line XXIV—XXIV of FIG. 22;

FIG. 25 is an enlarged perspective view of a link plate used in the known chain belt of FIG. 22;

FIGS. 28–35 are views relating to a fourth embodiment of the invention, wherein FIGS. 28, 29, 30, 31, 32 and 33 correspond to those of FIGS. 1, 2, 3, 4, 5 and 6 of the first embodiment, respectively, and FIGS. 34 and 35 correspond to those of FIGS. 9 and 10 of the first embodiment, respectively;

DETAILED DESCRIPTION OF THE PREFERRED EMBODIMENTS

Figure 21:
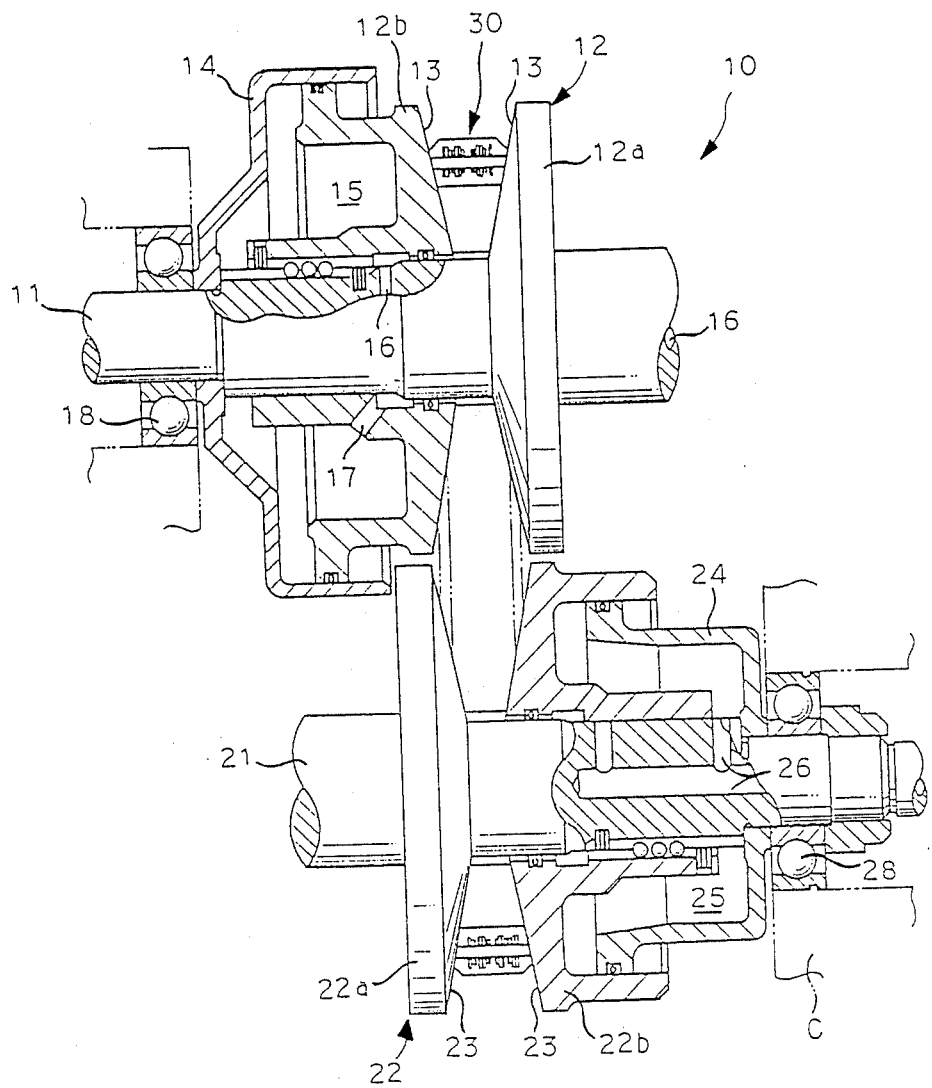
FIG. 21 is a fragmentary elevational view in cross section of an example of a continuously variable transmission to which the chain belt of the present invention is applicable.
Figure 22:
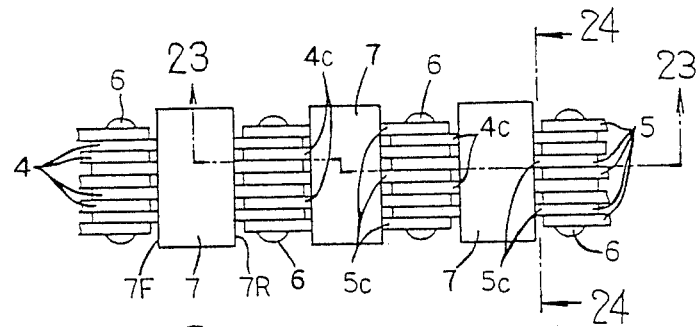
Figure 23:
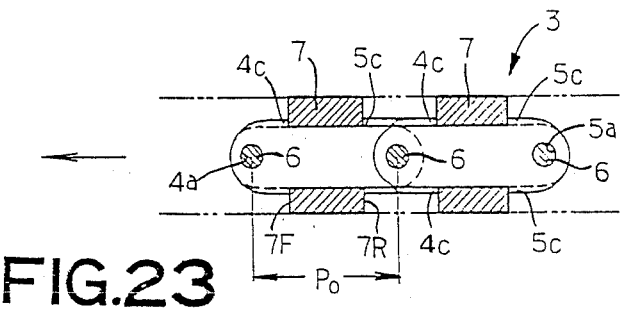
Figure 24:
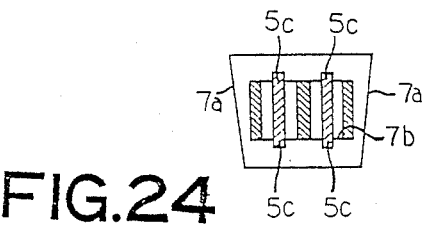
Figure 25:
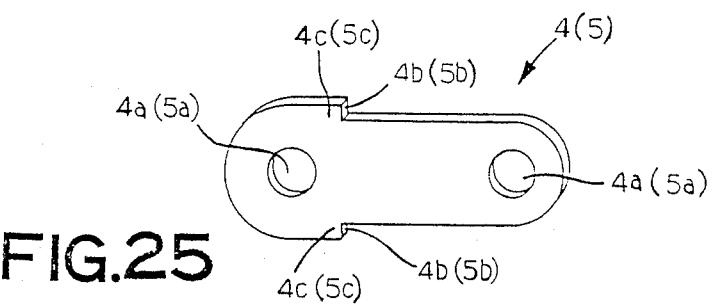
Figure 26:
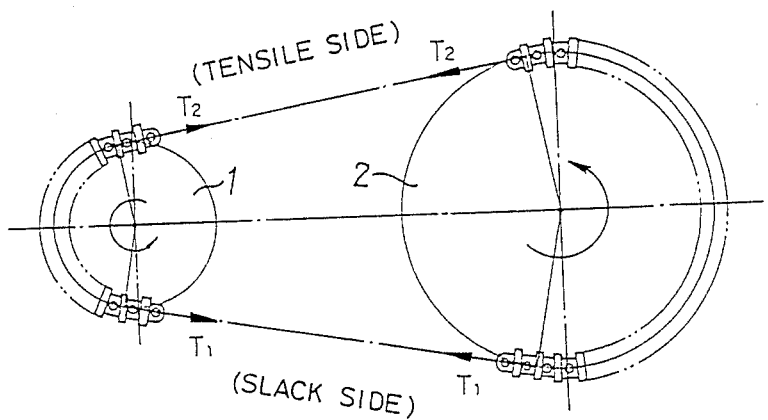
FIG. 26 is a schematic view showing a chain belt in engagement with drive and driven pulleys, illustrating tensile and slack sides of the belt.
Figure 27:
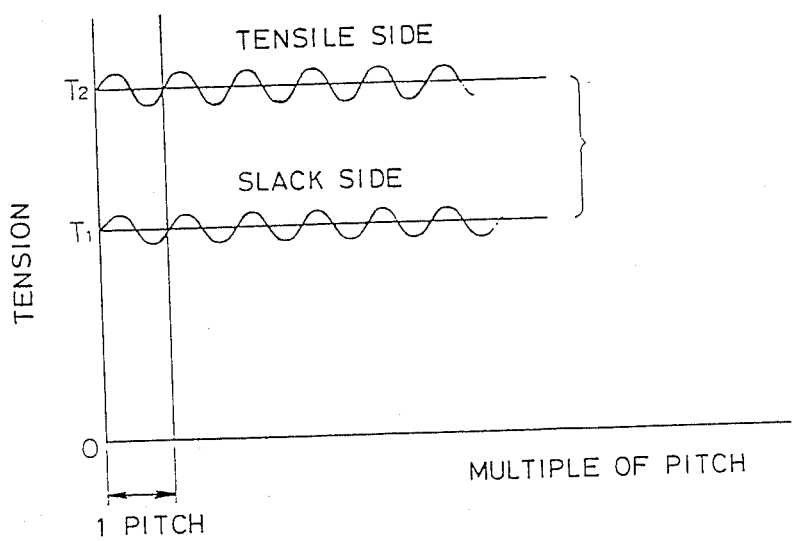
FIG. 27 is an illustration showing changes in the tension of and slack sides of a known chain belt.
Figure 28:
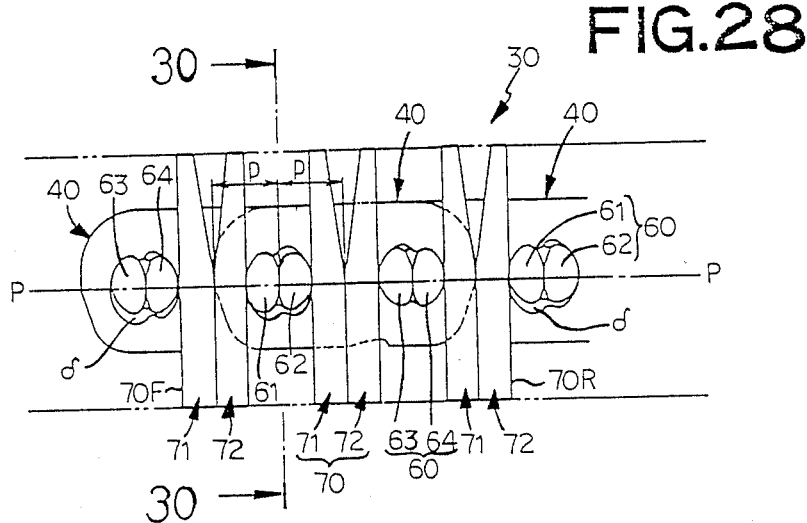
Figure 29:
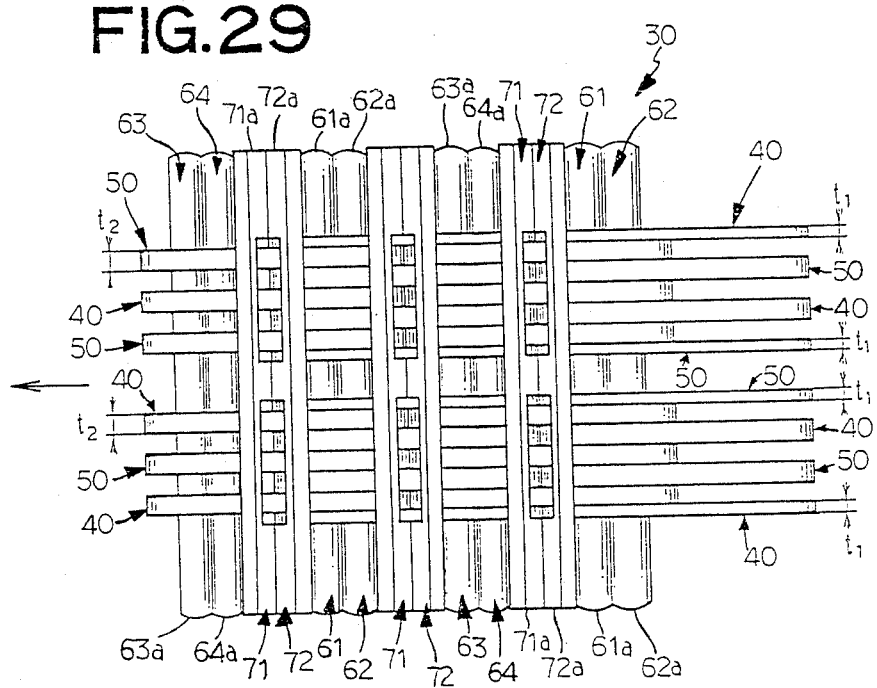
Figure 34:
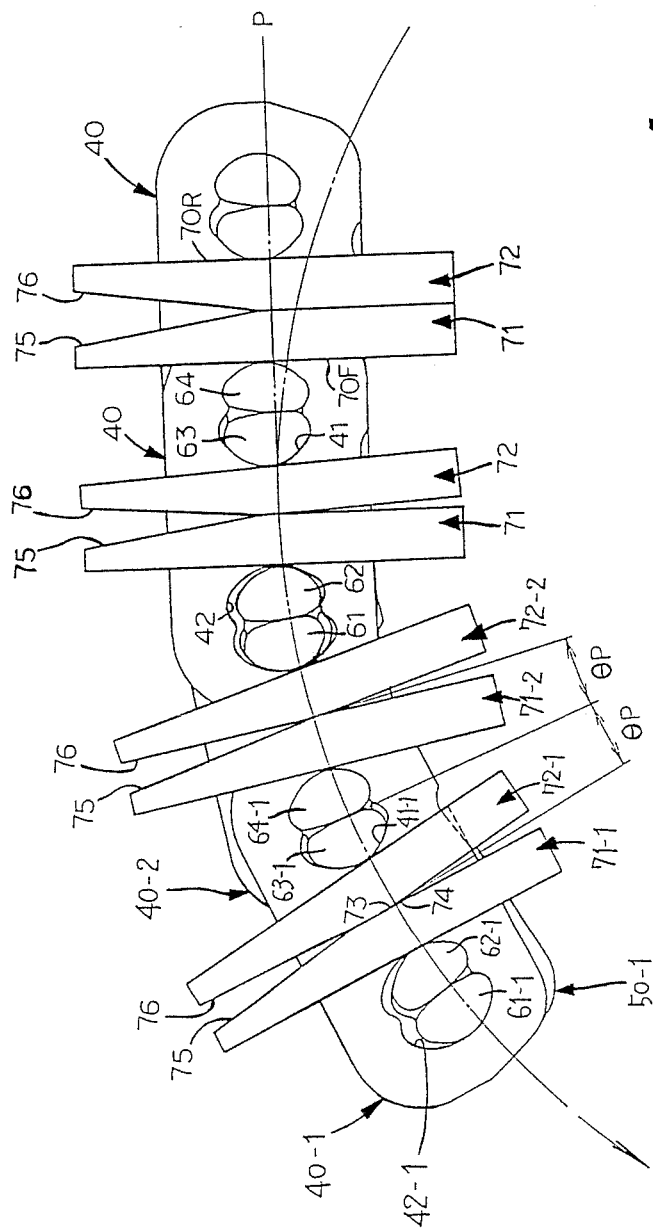
Figure 36:
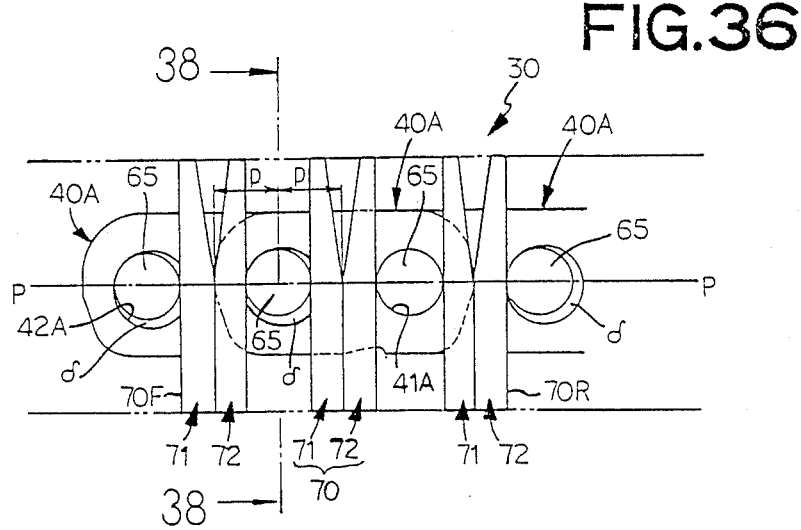
FIGS. 36–40 are views relating to a fifth embodiment of the invention, wherein FIGS. 36, 37, 38 and 39 correspond to FIGS. 11, 12, 13 and 14 of the second embodiment, respectively, and FIG. 40 corresponds to that of FIG. 17 of the second embodiment.
Figure 37:
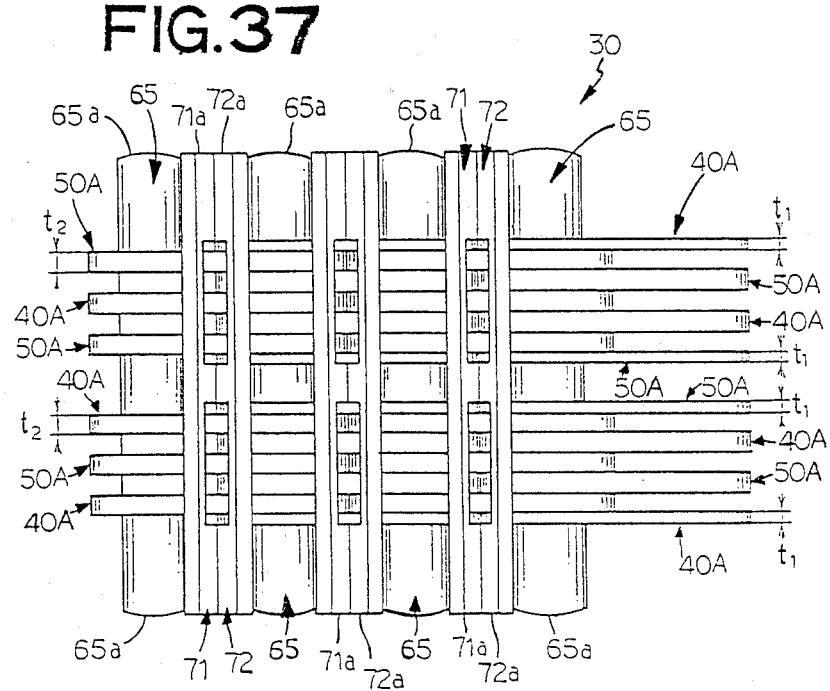
Figure 38:
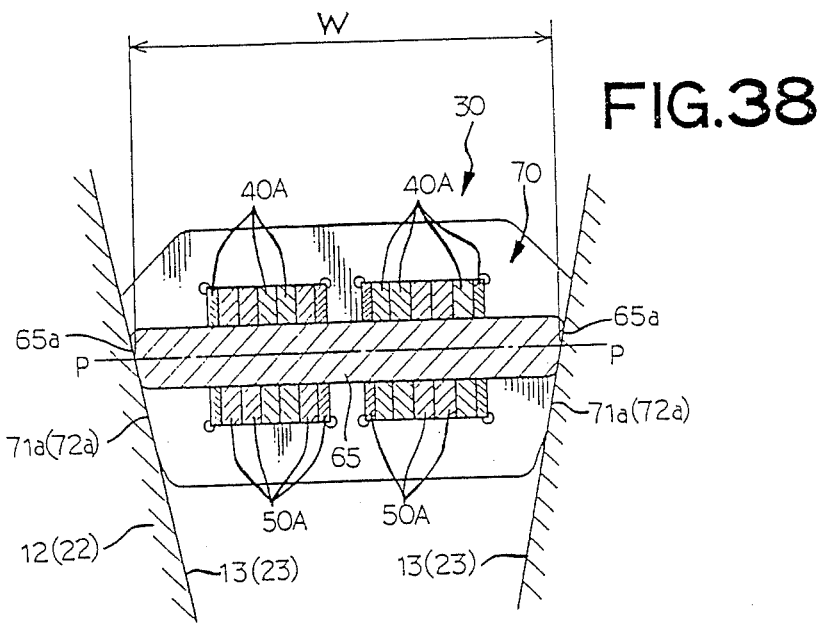
Figure 39:
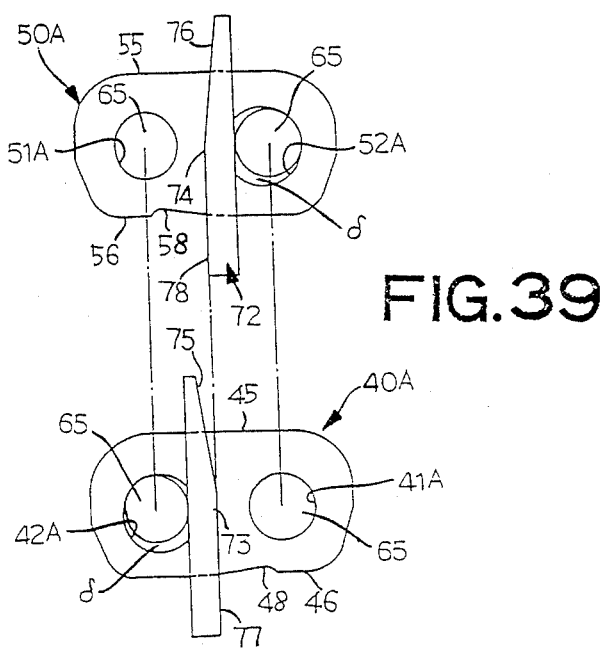

Referring first to FIG. 21, there will be described a belt-and-pulley type continuously variable transmission to which the chain belt according to the present invention is applicable.

In the figure, the continuously variable transmission is generally indicated at 10. The transmission 10 has an input shaft 11 and an output shaft 21 which are disposed in parallel with each other. On the end portions of these input and output shafts 11, 21, there are mounted an input or drive pulley 12 and an output or driven pulley 22, respectively.

The input pulley 12 consists of a fixed rotor 12a formed integrally with the input shaft 11, and a movable rotor 12b which is fitted on the input shaft 11 axially slidably relative to the fixed rotor 12a. The fixed and movable rotors 12a, 12b have opposed coned surfaces 13, 13 which cooperate with each other to define therebetween a V-shaped circumferential groove as seen in the cross sectional plane of FIG. 21. Like the input pulley 12, the output pulley 22 consists of a fixed rotor 22a and a movable rotor 22b, which have opposed coned surfaces 23, 23 defining therebetween a V-shaped circumferential groove. A chain belt 30 which will be described is adapted to be installed in engagement with the V-shaped circumferential grooves formed on the input and output pulleys 12, 22.

A cup-shaped housing 14 is press-fitted on the input shaft 11, and is fixed by a lock nut (not shown) in an axial direction of the shaft 11. The housing 14 is open toward the input pulley 12 and has an inner circumferential surface which fluid-tightly engages an outer circumferential surface of the movable rotor 12b, via an O-ring. Thus, the input shaft 11, movable rotor 12b and housing 14 cooperate with each other to define an oil chamber 15, which is connected to an external hydraulic power source through an oil passage 16 formed through the input shaft 11, and an oil passage 17 formed through the movable rotor 12b.

On the other hand, a cup-shaped piston 24 is press-fitted on the output shaft 21, and is fixed by a lock nut (not shown) in an axial direction of the shaft 21. An outer circumferential surface of the piston 24 fluid-tightly engages an inner circumferential surface of the movable rotor 22b (which is also cup-shaped) via an O-ring. The output shaft 21, movable rotor 22b and piston 24 cooperate with each other to define an oil chamber 25, which is connected to the external hydraulic power source, through an oil passage 26 formed through the output shaft 21. Reference numerals 18 and 28 denote bearings, and reference character C denotes a transaxle case.

With a hydraulic working fluid supplied and discharged to and from the oil chamber 15 of the input pulley 12, the width of the V-shaped groove of the input pulley 12 is changed. Following this change, the movable rotor 22b of the output pulley 22 is slidably axially moved, while the volume of the fluid in the oil chamber 25 in the output pulley 22 is changed. In other words, the ratio of the rotating speed of one of the input and output pulleys 12, 22 to that of the other pulley 12, 22, namely, the speed ratio of the continuously variable transmission 10 is changed by controlling the volume of the fluid in the oil chamber 15 of the input pulley 12. It is noted that a tension of the chain belt 30 is maintained at an optimum value by controlling the pressure of the fluid within the oil chamber 25 of the output pulley 22.

There will next be described the presently preferred embodiments of the chain belt constructed according to the invention.

There is illustrated in FIGS. 1-10 the first embodiment of the chain belt of the invention, which uses pin units each consisting of a pair of rocker pins, rather than a single pin (as used in the known chain belt of FIGS. 22-25), for pivotally connecting adjacent sets of link plates, as described below in detail. In the following description, the outer side or surface of the chain belt is referred to as "upper side" or "upper surface" while the inner side or surface is referred to as "lower side" or "lower surface", when appropriate.

In the figures, the chain belt is indicated generally at 30. The chain belt 30 consists of an endless chain body 31 and a multiplicity of block units 70. The chain body 31 consists of multiple sets of link plates 40, 50, each set being constituted by link plates 40 and link plates 50 which are arranged alternately in a direction of thickness of each link plate. The multiple sets of link plates 40, 50 are pivotally connected by pin units 60, in a direction of length of the link plates, whereby the endless chain body 31 is formed in a loop. Each pin unit 60 consisting of a pair of rocker pins 61–62 or 63–64. Each block unit 70 consists of a pair of blocks 71, 72 which are associated with a longitudinally intermediate portion of the appropriate set of link plates 40, 50.

Figure 5:
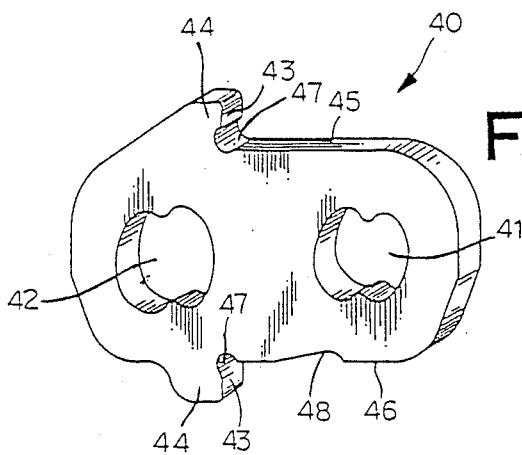

Each link plate 40 is formed from a suitable plate, by punching, with an outer profile as most clearly shown in FIG. 5. The link plate 40 is shaped and dimensioned such that the adjacent link plates 40 do not interfere with each other, when the chain belt 30 is installed on the appropriate pulleys 12, 22 (FIG. 21). The link plate 40 has a pair of pin holes 41, 42 in opposite longitudinal end portions thereof. Each pin hole 41, 42 has a configuration similar to a cross sectional shape of the pin unit 60. One of the end portions of the link plate 40 is formed with a pair of tabs 44 which define a pair of shoulders 43, 43 that are adapted for abutting contact with the appropriate block unit 70. Described more specifically, the tabs 44, 44 extend upwardly and downwardly from respective upper and lower surfaces 45, 46 of the body of the link plate 40. As suggested above, the upper surface 45 defines an outer side of the chain belt 30, while the lower surface 46 defines an inner side of the chain belt.

Figure 4:
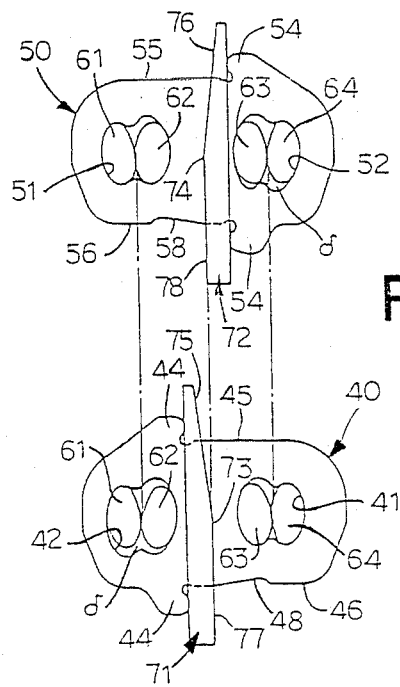

The pin hole 41 formed remote from the tabs 44, 44 is shaped such that the rocker pin 64 is snugly fitted in a portion of the pin hole 41 so that a rolling motion of the rocker pin 64 is inhibited, while the rocker pin 63 is fitted in the remainder of the hole 41, with a suitable gap or clearance left to permit the pin 63 to roll within the hole 41. This configuration of the pin hole 41 is similar to that of the prior art, for example, as disclosed in laid-open Publication No. 59-99142 of unexamined Japanese Patent Application. On the other hand, the other pin hole 42 formed for engagement with the rocker pins 61, 62 has a larger size than the pin hole 41. While the upper side of the pin hole 42 has substantially the same shape as that of the pin hole 41, the lower side of the pin hole 42 is formed so as to provide a suitable amount of clearance δ, as indicated in FIG. 4. The pin hole 42 is shaped such that the rocker pin 61 is held in stationary contact with a portion of the pin hole 42, while the rocker pin 62 is loosely fitted in the remainder of the hole 42, with a suitable upper clearance also left so as to allow a rolling motion of the rocker pin 62, like the rocker pin 63. As shown in FIG. 5, the link plate 40 has a pair of cutouts 47, 47 in the form of fillets formed at corners between the shoulders 43 and the upper and lower surfaces 45, 46, to facilitate contacts of the appropriate block unit 70 with the shoulders 43, 43. Further, the link plate 40 has a recess 48 in the lower surface 46, so that the recess 48 allows the block unit 70 to be inclined, while the block unit 70 is in engagement with the pulleys 12, 22.

Figure 6:
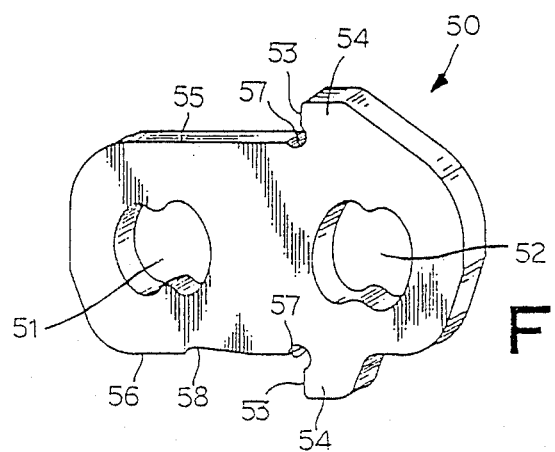

Each of the second link plates 50 has the same configuration as the first link plates 40, but is positioned in the opposite orientation with respect to the first link plate 40. More specifically, the link plate 50 has a pair of pin holes 51, 52 in its opposite longitudinal end portions, as shown in FIG. 6. One of the end portions is formed with outwardly and inwardly extending tabs 54, 54 which define a pair of shoulders 53, 53. The link plate 50 has a pair of cutouts 57, 57 in the form of fillets formed at corners between the shoulders 53 and upper and lower surfaces 55, 56 of the body of the plate. The lower surface 56 is formed with a recess 58 which permits the appropriate block unit 70 to be inclined, while the block unit 70 is in engagement with the pulleys 12, 22.

The pin hole 51, which corresponds to the pin hole 1 of the first link plate 40, is shaped such that the rocker pin 61 is snugly fitted in a portion of the hole 51, for stationary contact with the same, while the rocker pin 62 is loosely fitted in the remainder of the hole 51, for rolling contact with the same. The other pin hole 52 on the side of the tabs 54 corresponds to the pin hole 42, and has a larger size than the pin hole 51. As indicated in FIG. 4, the pin hole 52 is also formed so as to provide a suitable amount of clearance $\delta$ with respect to the rocker pins 63, 64.

Figure 3:
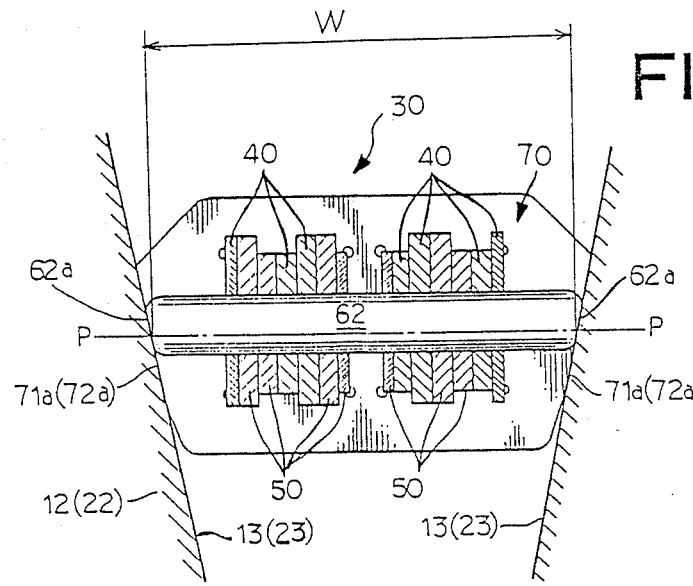
Figure 10:
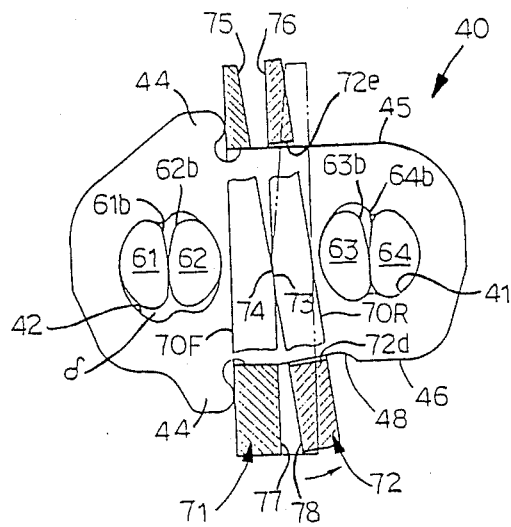

As indicated in FIG. 3, the rocker pins 61-62 or 63-64 of the pin units 60 have a length which is determined such that opposite end faces 61a, 62a, 63a 64a of the pins 61-64 contact the opposed coned surfaces of the pulleys 12, 22. For smooth contact with the pulley surfaces, the end faces 61a-64a of the rocker pins 61-64 are formed into a part-spherical shape. As indicated in FIG. 10, each pair of rocker pins 61, 62, or 63, 64 has rolling surfaces 61b, 62b or 63b, 64b, which extend in the longitudinal direction, for rolling contact with each other. The configuration of these rolling surfaces is described in detail, for example, in laid-open Publication No. 59-99142 of unexamined Japanese Patent Application. The first and second pairs of rocker pins 61-62 and 63-64 having the mutually contacting rolling surfaces 61b-64b and the end faces 61a-64a engageable with the pulleys 12, 22 constitute first pivot means which provide two first bending points of the chain belt 30.

Figure 1:
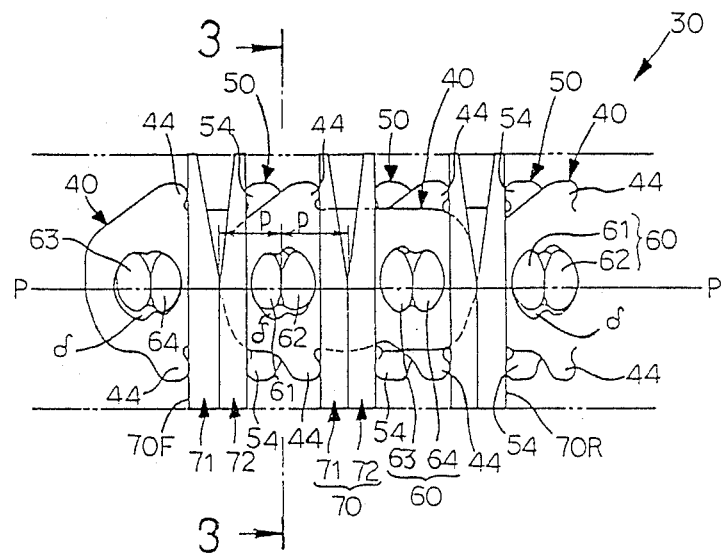
Figure 8:
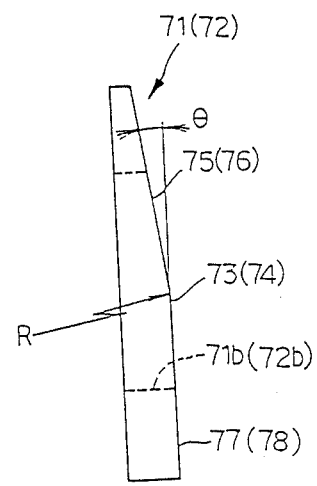
Figure 7:
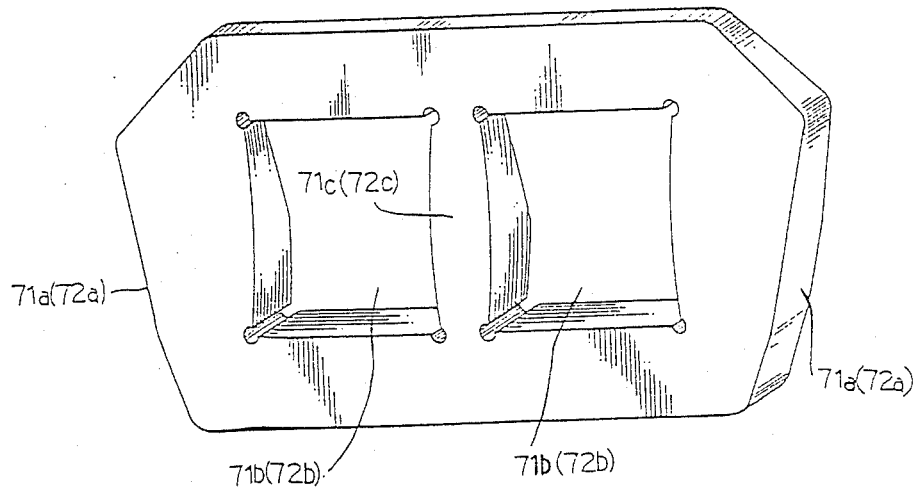

On the other hand, each of the pair of blocks 71, 72 which constitute each block unit 70 is formed from a suitable plate. The block 71 (72) has a pair of opposed angled surfaces 71a (72a), 71a (72a) on its opposite lateral ends, as indicated in FIGS. 7 and 8. These angled surfaces 71a (72a) are engageable with the opposed coned surfaces of the pulleys 12, 22. Each block 71 (72) has a partition wall 71c (72c) in its laterally central portion, and a pair of two apertures 71b (72b) which are separated by the partition wall 71c (72c). The apertures 71b (72b) are formed in the direction of thickness of the block 71 (72). The block 71 (72) has a straight surface which is held in abutting contact with the shoulders 43 (53) of the appropriate link plate 40 (50). However, a surface opposite to this straight surface is not straight. Described more particularly referring to FIG. 8, the right surface as seen in FIG. 8 consists of a vertically intermediate, curved rolling surface 73 (74) which has a suitable radius R of curvature, a tapered surface 75 (76) which extends upwardly from the curved rolling surface 73 (74), and a vertical surface 77 (78) which extends downwardly from the curved rolling surface 73 (74). The intermediate curved rolling surface 73 (74) is formed such that the center of the curvature lies on a pitch line P—P of the chain belt 30, as indicated in FIG. 1. The radius R of curvature of the rolling surface 73 (74) is equal to that of the rolling surfaces 61b-64b of the rocker pins 61-64 described above. The two blocks 71, 72 of each block unit 70 are positioned such that their rolling surfaces 73, 74 are held in rolling contact with each other. Each block unit 70 provides second pivot means which defines a second bending point of the chain belt 30.

An angle $\theta$ formed between the upper tapered surface 75 (76) and the lower vertical surface 77 (78) of the block 71 (72) is determined so as to avoid mutual contact of the tapered surfaces 75, 76 even when the chain belt 30 engages the minimum effective diameter of the pulley 12 (22). While the partition wall 71c (72c) is provided in the instant embodiment for increasing the strength of the blocks 71, 72, the partition wall 71c (72c) is not essential.

The chain belt 30 constructed as described above is assembled in the following manner:

Initially, the pair of blocks 71, 72 of the block unit 70 are positioned such that the rolling surfaces 73 and 74 contact each other. The first link plates 40 and the second link plates 50 are inserted through the apertures 71b, 72b of the blocks 71, 72, such that the link plates 40 and 50 are disposed alternately in the direction of thickness of the plates. The second link plates 50 are inserted in the rotating direction (indicated by arrow in FIG. 9) of the chain belt 30, while the first link plates 40 are inserted in the direction opposite to the rotating direction, as indicated in FIG. 4. As a result, the pair of blocks 71, 72 of each block unit 70 are held in position with front and rear surfaces 70F and 70R of the block unit 70 in abutting contact with the tabs 44, 54 of the link plates 40, 50. Thus, multiple sets of link plates 40, 50 each set having each block unit 70 are prepared.

Then, the adjacent sets of link plates 40, 50 are disposed relative to each other such that spaces left between the end portions of the link plates of the one set are filled by the end portions of the link plates of the other set. Subsequently, the rocker pins 61, 62 are inserted through the pin holes 42, 51 of the link plates 40, 50 such that the rolling surfaces 61b, 62b contact each other, and the rocker pins 63, 64 are inserted through the pin holes 41, 52 such that the rolling surfaces 63b, 64b contact each other. The part-spherical end faces 61a-64a facilitate insertion of the rocker pins 61-64 into the pin holes 41, 42, 51, 52.

With the above procedure repeated, the multiple sets of link plates 40, 50 with the block units 70 are connected in series into the endless chain belt 30.

In the thus assembled state, the tabs 44, 54 prevent the front surfaces 70F of the block units 70 from contacting the rocker pins 62, 64, and prevent the rear surfaces 70R from contacting the rocker pins 61, 63. In the linear segments of the chain belt 30 between the pulleys 12 and 22, the vertical surfaces 77 and 78 of each block unit 70 are held in contact with each other, while the upper tapered surfaces 75 and 76 are spaced away from each other, as indicated in FIG. 1. Further, the instant chain belt 30 is dimensioned such that the front surfaces 70F of the block units 70 are held in contact with the shoulders 43 of the tabs 44 of the first link plates 40, while at the same time the rocker pins 61, 63 are also held in contact with the pin holes 42.

Figure 2:
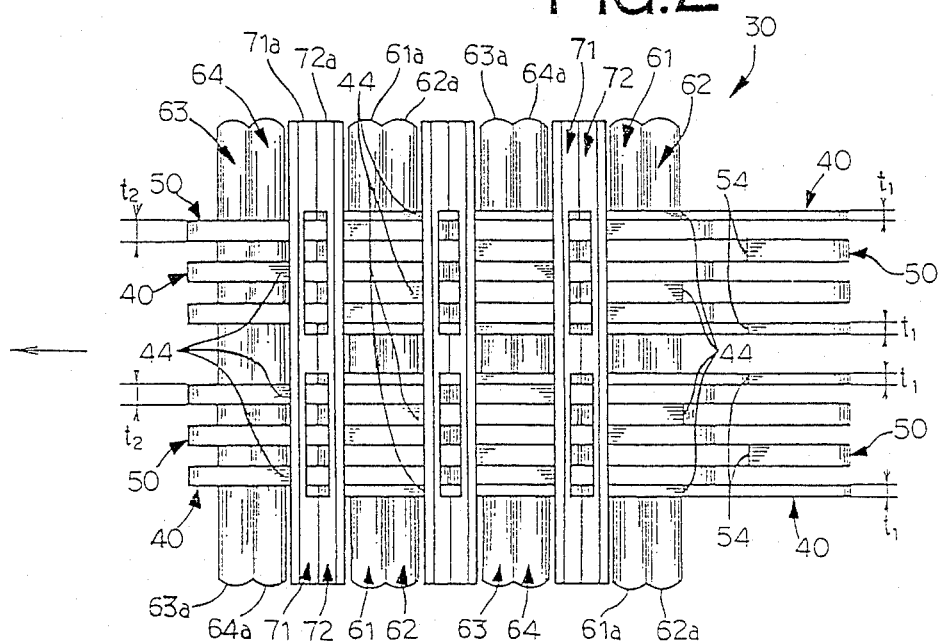

As shown in FIG. 2, a total of seven link plates 40, 50 are alternately inserted through each aperture 71b, 72b of the block 71, 72. It is noted that a thickness t1 of the outermost link plates 40 (nearest to the angled surfaces 71a, 72a) and the innermost link plates 40 adjacent to the partition wall 71c, 72c is determined to be half of a thickness t2 of the other link plates 40, 50, so that the power transmitting capacity of the chain belt 30 is constant in the direction of rotation of the belt.

In the chain belt 30 constructed as described above, the bending pitch p is equal to a distance between a point of rolling contact of the rocker pins 61, 62 (63, 64) and a point of rolling contact of the two blocks 71, 72 of each block unit 70, as indicated in FIG. 1. This bending pitch p is substantially a half of the bending pitch po (FIG. 23) of the known chain belt 3 of FIGS. 22–25, which is defined by the two adjacent pins 6, 6 (equivalent to the pin units 60, 60 in the present embodiment).

The thus constructed chain belt 30 for the continuously variable transmission 10 (FIG. 21) is operated in the following manner:

In operation of the continuously variable transmission 10, the blocks 71, 72 receive a substantial portion of the forces exerted to the chain belt 30 due to hydraulic thrusts applied to the oil chambers 15, 25 of the drive and driven pulleys 12, 22.

In this condition, a torque of the drive pulley 12 is imparted to the blocks 71, 72 which frictionally engage the opposed coned surfaces 13, 13 which define the V-groove. The torque received by the blocks 71, 72 of the block unit 70 is transmitted to the link plates 40, 50 and rocker pins 61–64 via the tabs 44, 54, and to the blocks 71, 72 of the subsequent block units, successively. Eventually, the torque is transmitted from the drive pulley 12 to the driven pulley 22, through the tabs 44, 54 of the link plates 40, 50 and the rocker pins 61–64. When the chain belt 30 is drawn in the direction of arrow in FIG. 2, the link plates 40, 50 whose tabs 44, 54 are directly driven by the block unit 70 consists of a leading set of three link plates having the comparatively large thickness t2, and a following set of two link plates having the comparatively small thickness t1 and two link plates having the comparatively large thickness t2. The torque is transmitted through these alternate sets of seven link plates 40, 50. Since the thickness t1 is equal to about a half of the thickness t2, the power transmitting capacity of the chain belt 30 is constant in its rotating direction.

The chain belt 30 is adapted to contact the pulleys 12, 22, at each bending point, rather than at each block positioned intermediate between the bending points in the conventional arrangement (See laid-open Publication No. 35-14807 of examined Japanese Patent Application).

Figure 9:
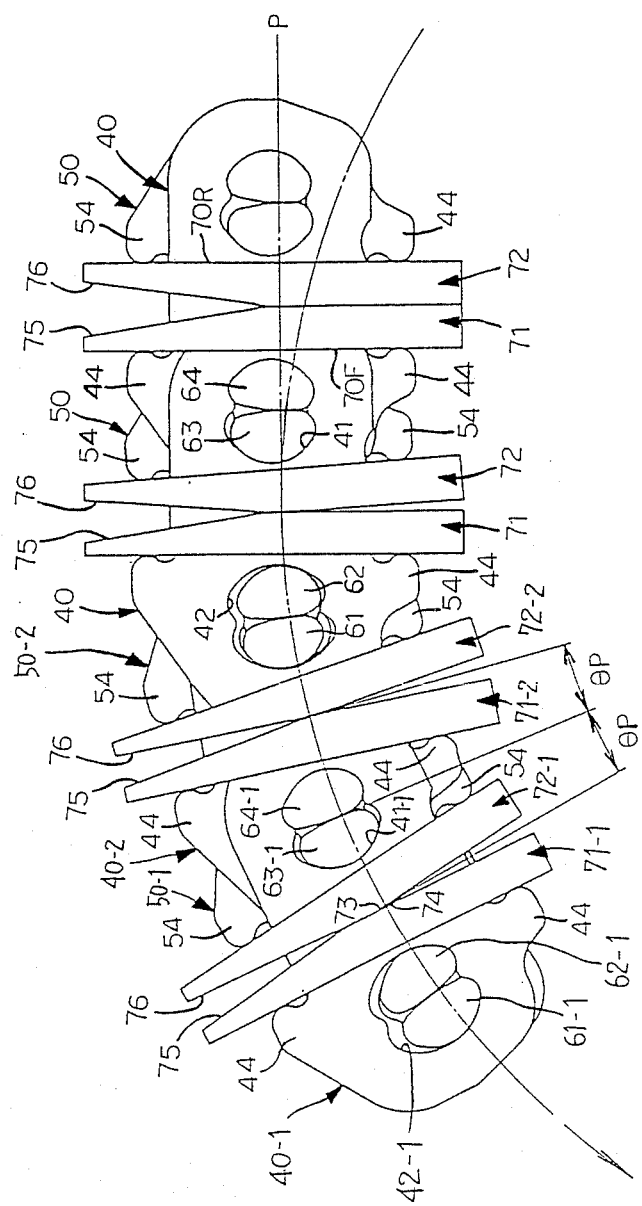

Described more specifically by reference to FIG. 9, upon incremental rotation of the chain belt 30 by a distance equal to the bending pitch p, the rocker pins 61–64 and blocks 71, 72 contact the pulleys 12, 22, such that the rocker pin 61 and the block 72 move as a unit while the rocker pin 64 and the block 71 move as a unit. Thus, the chain belt 30 and the pulleys 12, 22 are rotated in the direction of arrow indicated in FIG. 9.

In the condition of FIG. 9, two sides of a polygon formed by the chain belt 30 on the pulley 12, 22 consist, for example, of a straight line which connects the point of rolling contact between the rocker pins 61-1 and 62-1 of the link plate 40-1, and the point of rolling contact of the blocks 71-1 and 72-1, and a straight line which connects the point of rolling contact between the rocker pins 63-1 and 64-1 of the link plate 50-1 and the point of rolling contact of the blocks 71-1 and 72-1. In FIG. 9, the angle corresponding to the bending pitch p or one side of the polygon engaging the pulley is indicated as $\theta p$.

If the link plates 40-1, 50-1, 40-2 and 50-2 were provided in the conventional arrangement, the link plates 40-1, 40-2 would not be moved relative to the link plates 50-1, 50-2. In the present arrangement, however, the blocks 71-1, 72-1 are movable relative to the corresponding blocks 71-2, 72-2 at their rolling surfaces, like the conventionally used rocker pins. For instance, the block 72-1 and the rocker pin 61-1 are downwardly movable relative to the link plate 40-1, for contact with the pulley. Accordingly, the link plate 50-1 associated with the block 72-1 is movable relative to the link plate 40-1.

Further, since the link plate 50 is moved in response to a movement of the rocker pin 61 and block 72, the link plate 50 is moved relative to the rocker pins 63, 64 which are in the process of engaging the pulley.

When the blocks 71, 72 of the chain belt 30 come into engagement with the pulley 12, 22 or leave the pulley, the blocks 71, 72 receive forces that cause the blocks to be inclined in a plane parallel to the plane of the link plates 40, 50. However, the inclining movement is limited by the tabs 43, 53 and the lower surfaces 46, 56 of the link plates 40, 50, which are located away from the center of the inclination. Thus, the durability of the blocks 71, 72 is improved. When the block 72 comes into contact with the pulley, the block 72 is inclined relative to the link plate 40, from a position indicated in phantom line in FIG. 10 to a position indicated in solid line in the same figure, with the rolling surface 73 rolling on the rolling surface 74 of the block 71. However, the recess 48 formed in the lower surface 46 of the link plate 40 prevents an interference between the lower surface 46 and a lower surface 72d of the aperture 72b. To prevent an interference between the upper surface 45 and an upper surface of the aperture 72e, it is noted that there is provided a sufficient clearance between the upper surface 45 of the link plate 40 and an upper surface 72e of the aperture 72b, in order to prevent an interference between these surfaces 45, 72e when the block 72 is inclined.

As described above, the bending pitch p of the chain belt 30 of the present embodiment is substantially a half of that of the known chain velt, and the polygon defined by the bending points of the portions of the belt 30 engaging the pulley 12, 22 can be made considerably similar to a circle.

Consequently, the variation in the tension of the chain belt 30 is reduced to about a half of that experienced on the conventional chain belt of FIGS. 22–25, whereby the noises arising from the belt may be reduced.

Further, the above object may be achieved without an increase in the size of the belt.

Moreover, the upper tapered surfaces 75, 76 which define a V shape between the two blocks 71, 72 of the block unit 70 contribute to a decrease in the weight of the chain belt 30, which results in reducing a portion of the tension of the belt due to the centrifugal force, thereby leading to an improvement in the durability of the belt.

Furthermore, the reduction in the bending pitch of the chain belt 30 permits reduction in the minimum effective diameter of the pulleys, which is extremely advantageous for widening the range of the speed ratio of the continuously variable transmission, and minimizing the size of the transmission.

Since the tension of the belt 30 is received by both the tabs 44, 54 of the link plates 40, 50 and the rocker pins 61, 64 contacting the pin holes 42, 41, the torque that can be transmitted by the belt 30 can be accordingly increased.

Referring next to FIGS. 11–17, there will be described the second embodiment of the chain belt of the invention for the continuously variable transmission 10. In FIGS. 11–17, the same reference numerals as used in FIGS. 1–6 and FIG. 10 will be used to identify the corresponding components or parts. In the interest of brevity and simplification, no redundant description of these components or parts will be provided.

In the present embodiment, roller pins 65 are used in place of the rocker pins 61–64 used in the preceding embodiment, for pivotally connecting link plates 40A and 50A which correspond to the link plates 40 and 50 of the preceding embodiment.

Figure 15:
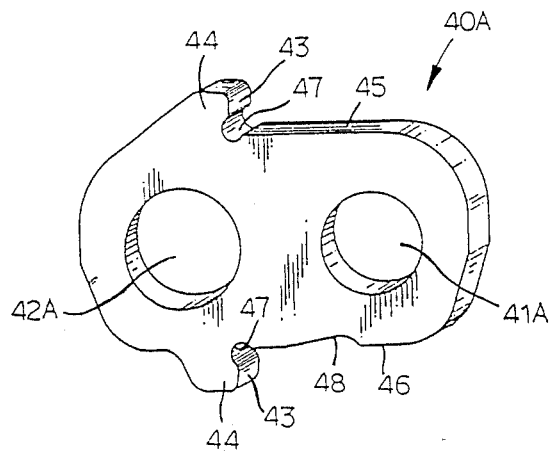
Figure 16:
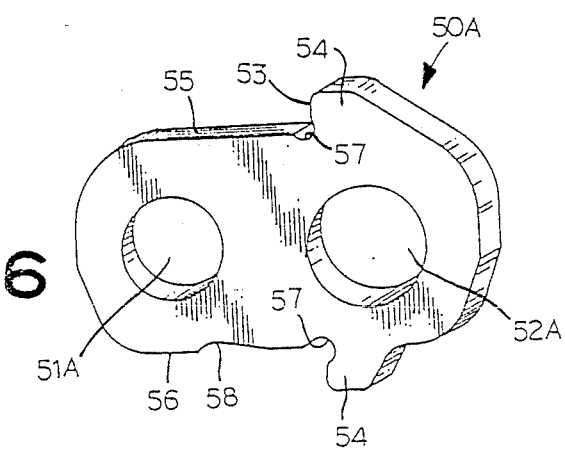
Figure 17:
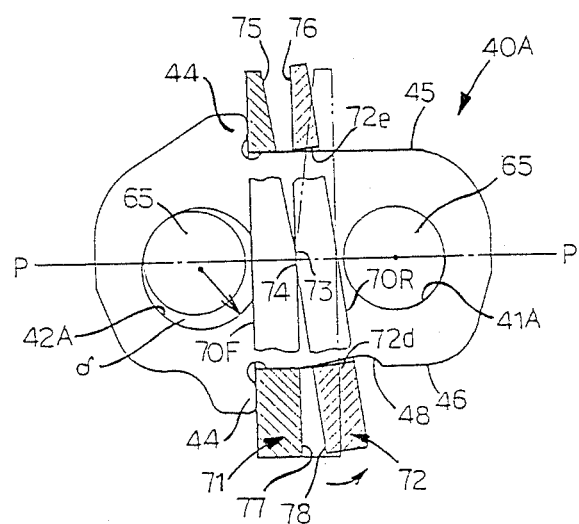

Each of the link plates 40A has two round pin holes 41A and 42A formed in its opposite end portions, as shown in FIG. 15. Similarly, each of the link plates 50A has two round pin holes 51A and 52A formed in its opposite end portions, as shown in FIG. 16. The pin holes 42A, 52A on the side of the tabs 44, 54 have a larger diameter than the pin holes 41A, 51A remote from the tabs 44, 54. As indicated in FIG. 17, the center of each pin hole 42A, 52A is located below the pitch line P—P (as viewed in the figure). Namely, the diameter of the pin holes 42A, 52A is larger than that of the roller pins 65. However, the pin holes 42A, 52A are shaped and dimensioned so that the corresponding roller pins 65 are held in contact with these pin holes while the link plates 40A, 50A are moved along the path of the pulley 12, 22.

The roller pins 65 pivotally connecting the link plates 40A, 50A have end faces 65a which are formed into a part-spherical shape. The roller pins 65 are axially fixed relative to the link plates 40A, 50A, by retainer rings fitted on the pins, or by calking part of the outermost link plates against the pins.

In other aspects, the chain belt 30 of the present embodiment is identical in construction with the first embodiment. Accordingly, the instant embodiment provides the same advantage as the first embodiment.

Figure 14:
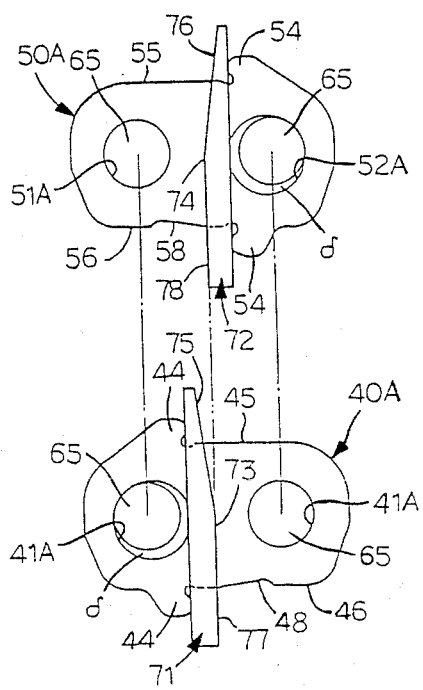
FIGS. 11–17 are views relating to a second embodiment of the present invention, wherein FIG. 11 a side elevational view of a portion of a chain belt of the second embodiment.
Figure 13:
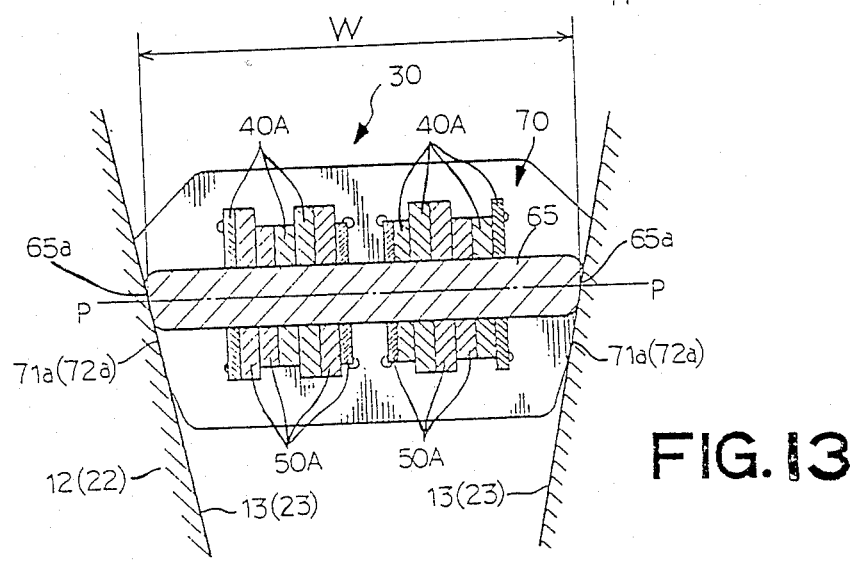
Figure 11:
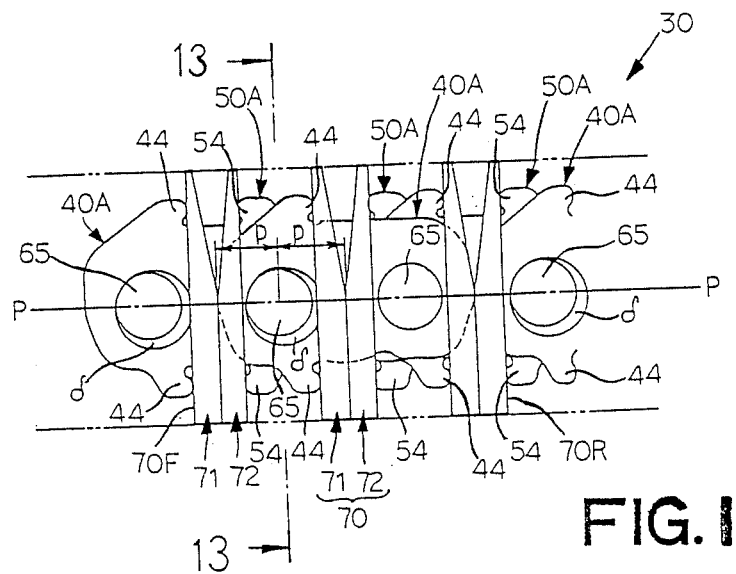
Figure 12:
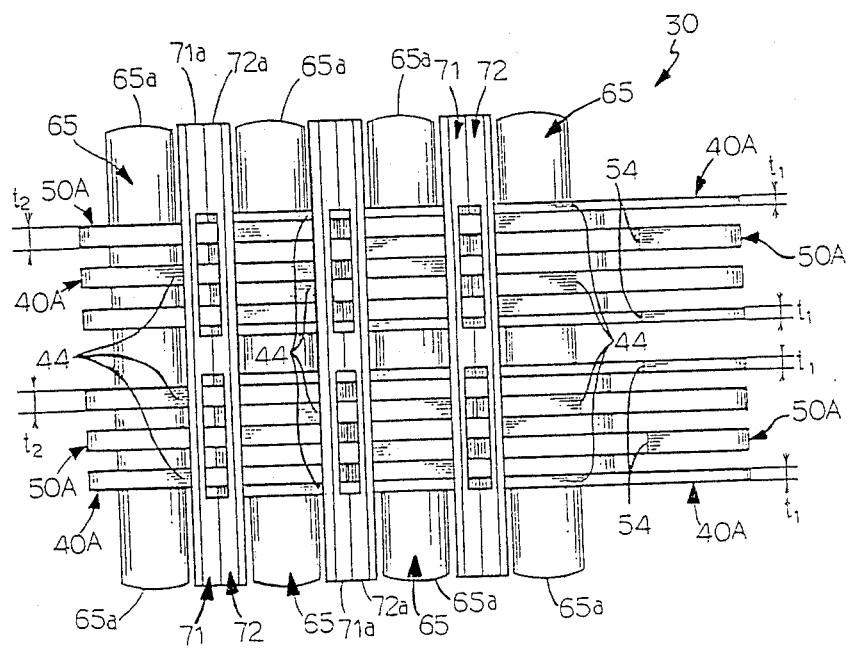

The third embodiment of the chain belt 30 of the invention for the continuously variable transmission 10 is illustrated in FIGS. 18–20, wherein the same reference numerals as used in FIGS. 11, 14 and 17 are used to identify the corresponding components or parts, which will not be described.

The present embodiment is adapted such that the roller pins are not in contact with the pin holes on the side of the tabs of the link plates.

Described more specifically, the present chain belt 30 uses link plates 40B, 50B which have round pin holes 41B, 42B, and 51B, 52B, on the opposite end portions, as shown in FIG. 19. The pin holes 42B, 52B on the side of the tabs 44, 54 have a larger diameter than the pin holes 41B, 51B remote from the tabs 44, 54. That is, the diameter of the pin holes 42B, 52B is larger than that of the roller pins 65. The center of each pin hole 42B, 52B lies on the pitch line P—P, and the roller pins 65 are positioned substantially concentrically with the pin holes 42B, 52B, as indicated in FIG. 20. The pin holes 42B, 52B are shaped and dimensioned such that the inner surface of the pin holes are spaced away from the roller pins 65, even while the link plates 40B, 50B are moved along the path of the pulley 12, 22.

In other aspect, the instant third embodiment is identical with the second embodiment.

In the third embodiment wherein the roller pins 65 are kept away from the pin holes 42B, 52B on the side of the tabs 44, 54, there exist no sliding contact between the roller pins 65 and the pin holes 42B, 52B. Accordingly, the link plates 40B, 50B have increased durability.

By reference to FIGS. 28–35, there is shown the chain belt 30 according to the fourth embodiment of the present invention. In the present embodiment and the fifth and sixth embodiments which will be described, the link plates 40, 50 do not have the tabs 44, 54 as used in the preceding embodiments. These embodiments are characterized in that each block unit 70 is sandwiched by the pin units 60, 60. Stated more particularly referring to the above-indicated figures, the chain belt 30 is assembled such that the rocker pins 62 and 64 are held in contact with the leading front surface 70F of the block unit 70 as viewed in the rotating direction of the belt, while the rocker pins 61 and 63 are held in contact with the trailing rear surface 70R of the block unit 70. Thus, the blocks 71, 72 of each block unit 70 are sandwiched by and between the pin units 60, 60. When the chain belt 30 is installed on the pulleys 12, 22, the vertical surfaces 77, 78 of the blocks 71, 72 in the straight segments of the chain belt 30 between the pulleys 12, 22 contact each other, while the upper tapered surfaces 75, 76 of the blocks 71, 72 are spaced away from each other. While the chain belt 30 is transmitting a torque between the two pulleys 12, 22, the rocker pins 62, 64 are in contact with the front surface 70F of the block unit 70, while the rocker pins 61, 63 are in contact with the inner surfaces of the pin holes 42, 52.

As in the first embodiment of FIGS. 1–10, the rocker pin 61 and the block 72 are rotated as a unit, while the rocker pin 64 and the block 71 are rotated as a unit. Consequently, two sides of a polygon defined by the bending points of each portion of the chain belt 30 engaging the pulley 12, 22 consist of a straight line connecting a point of rolling contact between the rocker pins 61-1 and 62-1 of the link plate 40-1 and a point of rolling contact between the blocks 71-1 and 72-1, and a straight line connecting a point of rolling contact between the blocks 71-1 and 72-1 and a point of rolling contact between the rocker pins 63-1 and 64-1 of the link plate 50-1. Thus, the bending pitch p of the instant chain belt 30 is reduced to a half of that of the known chain belt 3 of FIGS. 22–25, whereby the noises due to the chain belt 30 are reduced.

Figure 40:
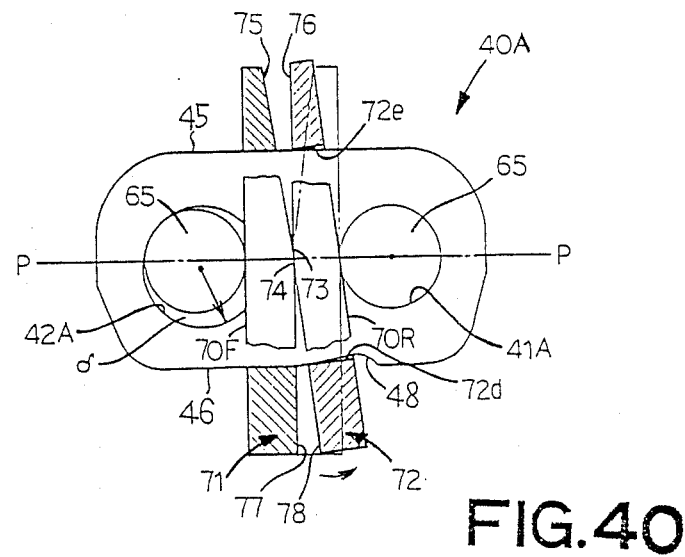
Figure 49:
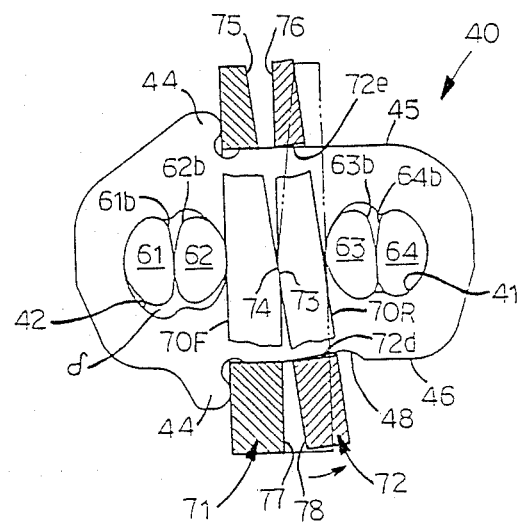
FIGS. 44–49 are views relating to a seventh embodiment of the invention, wherein FIGS. 44, 45, 46 and 47 correspond to those of FIGS. 1, 2, 3 and 4 of the first embodiment, respectively, and FIGS. 48 and 49 correspond to those of FIGS. 9 and 10 of the first embodiment, respectively.
Figure 41:
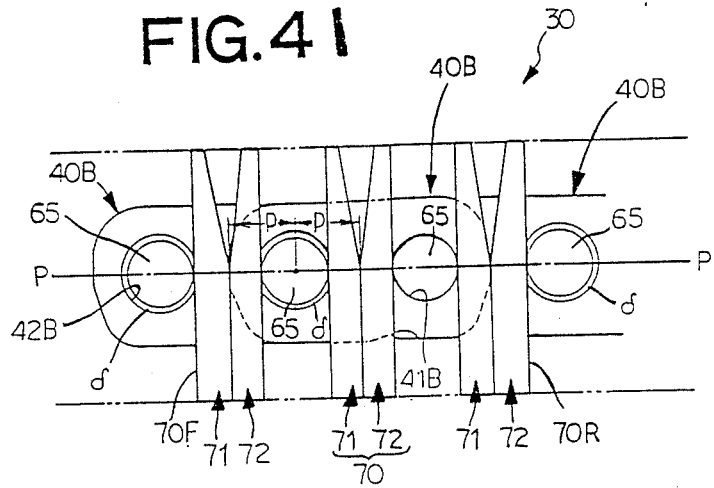
FIGS. 41, 42 and 43 are views relating to a sixth embodiment of the invention, which correspond to those of FIGS. 18, 19 and 20 of the third embodiment, respectively.

FIGS. 36–40 depict the fifth embodiment of the present invention. In the depicted chain belt 30, the roller pins 65 are used to pivotally connect the link plates 40A, 50A, and the pair of blocks 71, 72 of each block unit 70 are sandwiched by the roller pins 65, 65. As shown in FIGS. 40 and 41, each link plate 40A, 50A has two round pin holes 41A and 42A, or 51A and 52A, formed in its opposite end portions. The pin holes 42A, 52A formed in one of the end portions have a larger diameter than the pin holes 41A, 51A formed in the other end portion. That is, the diameter of the pin holes 42A, 52A is larger than that of the rocker pins 65. The center of the pin holes 42A, 52A is located below the pitch line P—P, and the roller pins 65 are adapted to be held in contact with the pin holes 42A, 52A while the link plates 40A, 50A are moved along the path of the pulley 12, 22. The present embodiment has the same advantage as the embodiment of FIGS. 11–17.

Figure 42:
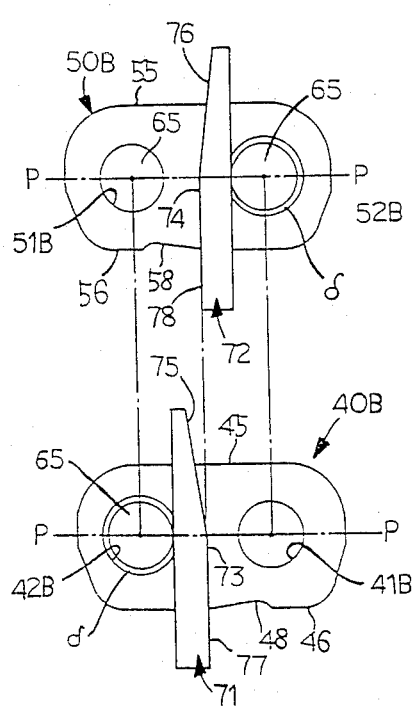
Figure 43:
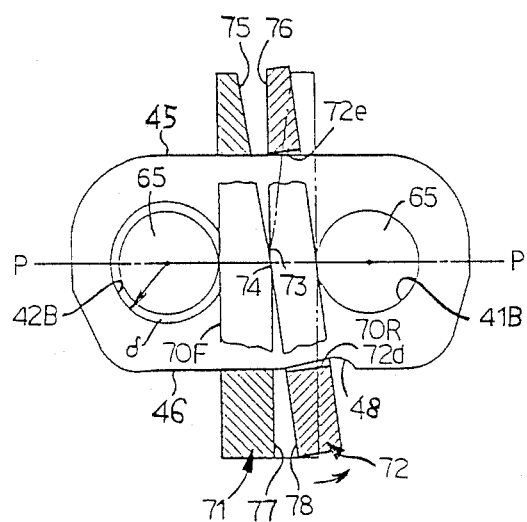
Figure 44:
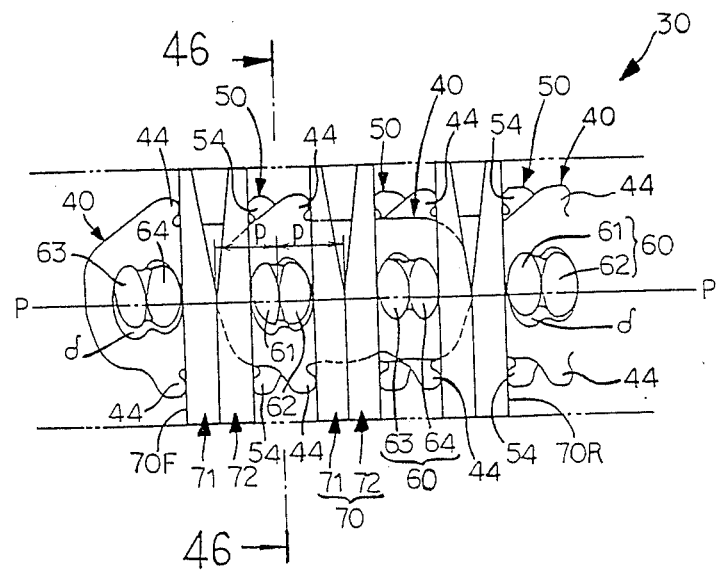
Figure 45:
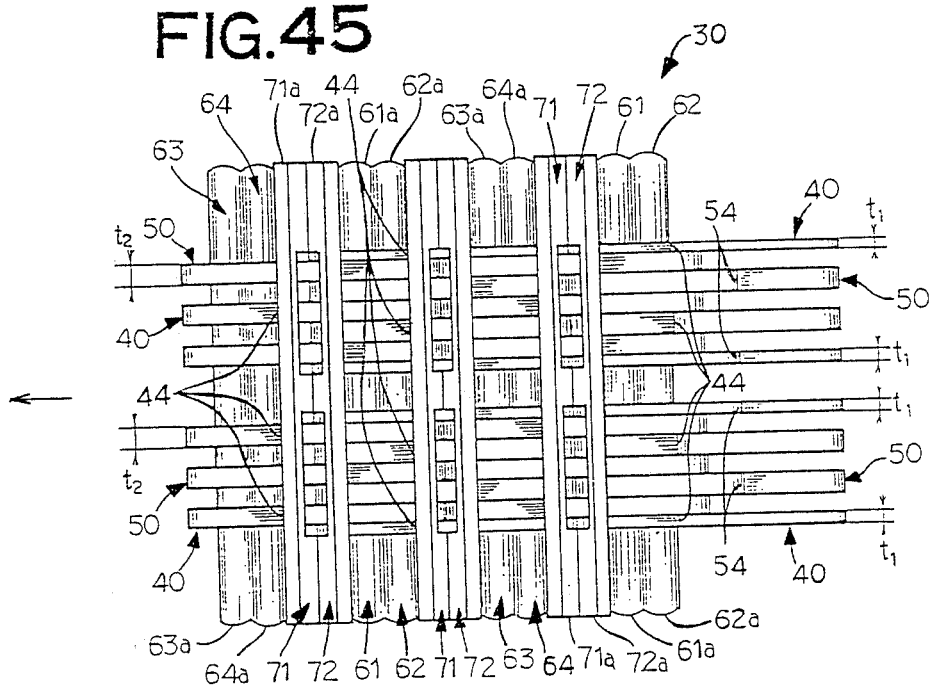
Figure 46:
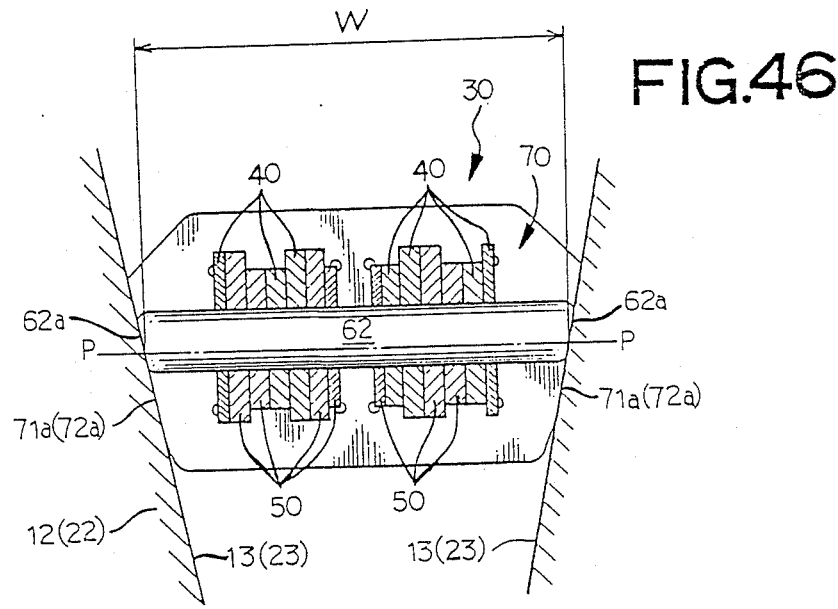
Figure 47:
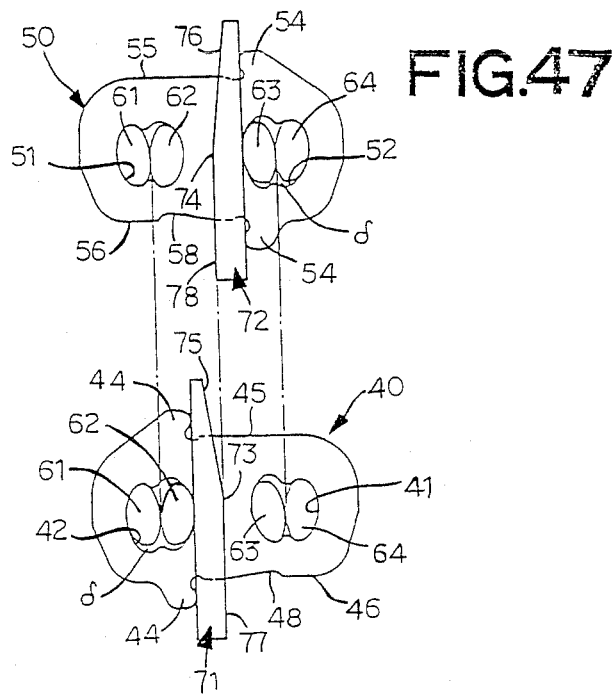

The sixth embodiment of the chain belt 30 according to the invention is illustrated in FIGS. 41-43, wherein the pair of blocks 71, 72 are sandwiched by and between the roller pins 65, 65, and the pin holes 42B, 52B formed in one end portion of the link plates 40B, 50B have a larger diameter than the pin holes 41B, 51B formed in the other end portion of the link plates 40B, 50B. The center of the pin holes 42B, 52B lies on the pitch line P—P, and the roller pins 65 are positioned concentrically with the pin holes 42B, 52B. The roller pins 65 are kept away from the inner surface of the pin holes 42B, 52B, even while the link plates 40B, 50B are moved along the path of the pulley 12, 22. The present sixth embodiment provides the same advantage as the embodiment of FIGS. 18–20.

The seventh embodiment of the chain belt 30 of the invention is illustrated in FIGS. 44–49. The present seventh, and the eighth and nineth embodiments which will be described are distinguished from the first, second and third embodiments, in that the block unit 70 is sandwiched by the pin units 60, 60 even though the link plates 40, 50 are formed with the tabs 44, 54. Namely, the chain belt 30 of FIGS. 44–49 is assembled such that the leading front surface 70F of the block unit 70 is engageable with the rocker pins 62, 64, without being disturbed by the tabs 44, while the trailing surface 70R of the block unit 70 is engageable with the rocker pins 61, 63, without being disturbed by the tabs 54. In the straight segments of the belt 30 between the two pulleys 12, 22, the vertical surfaces 77, 78 of the blocks 71, 72 contact each other, while the upper tapered surfaces 75, 76 are spaced apart from each other. At the same time, the leading front surface 70F of the block unit 70 contacts the shoulders 43 of the tabs 44 of the link plate 40, while the rocker pins 61, 63 contact the inner surface of the pin hole 42 of the link plate 40.

Figure 48:
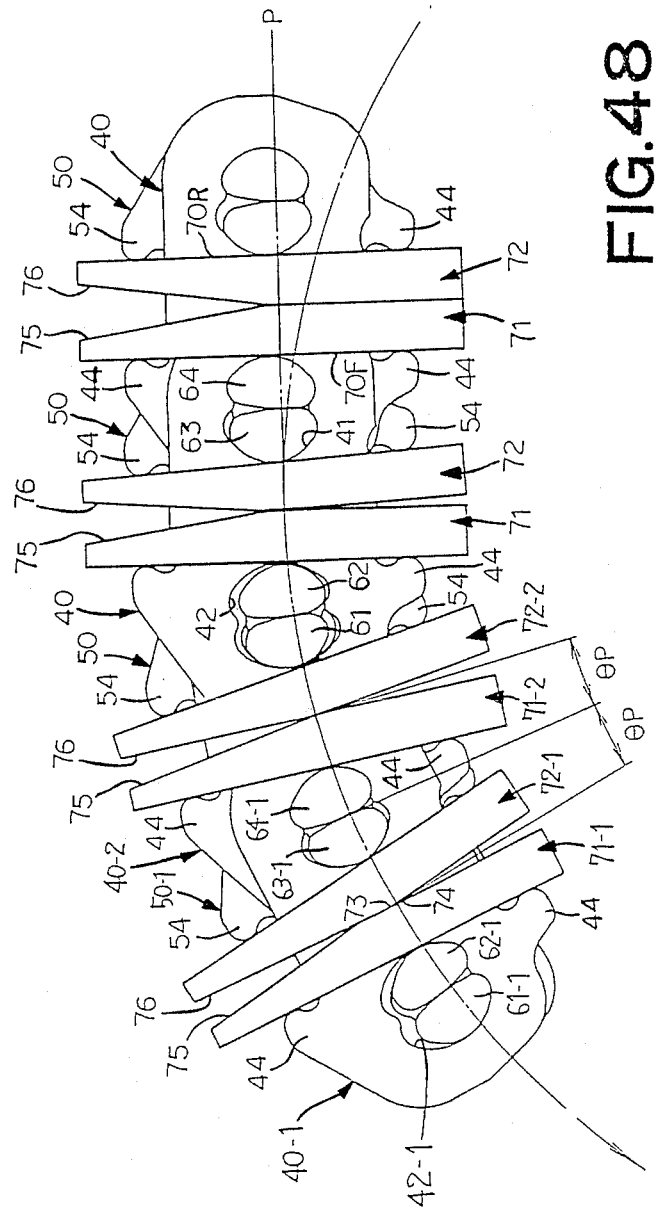
Figure 50:
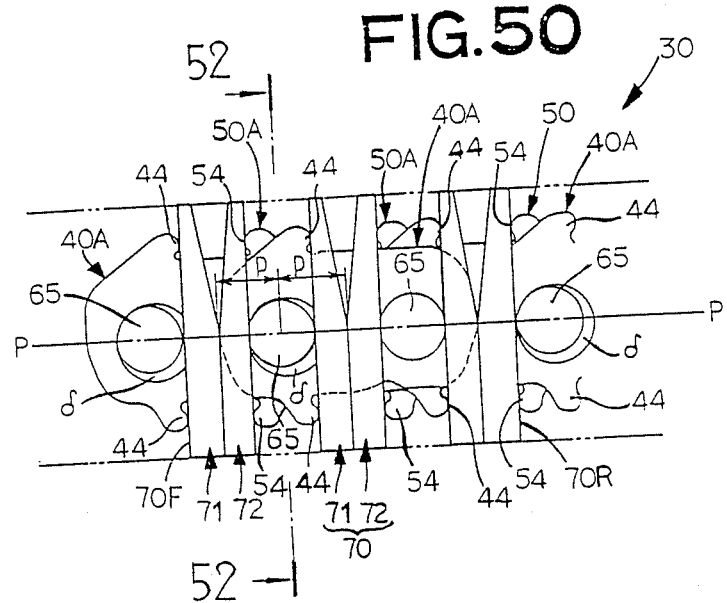
FIGS. 50–54 are views relating to an eighth embodiment of the invention, wherein FIGS. 50, 51, 52, 53 and 54 correspond to those of FIGS. 11, 12, 13 and 14 of the second embodiment, respectively, and FIG. 54 corresponds to that of FIG. 17 of the second embodiment, respectively.
Figure 51:
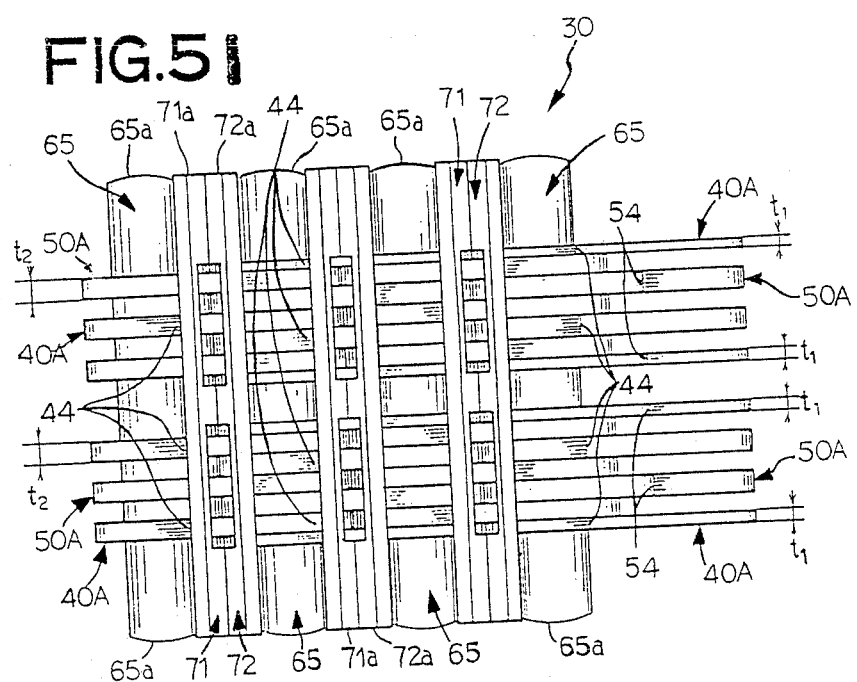
Figure 52:
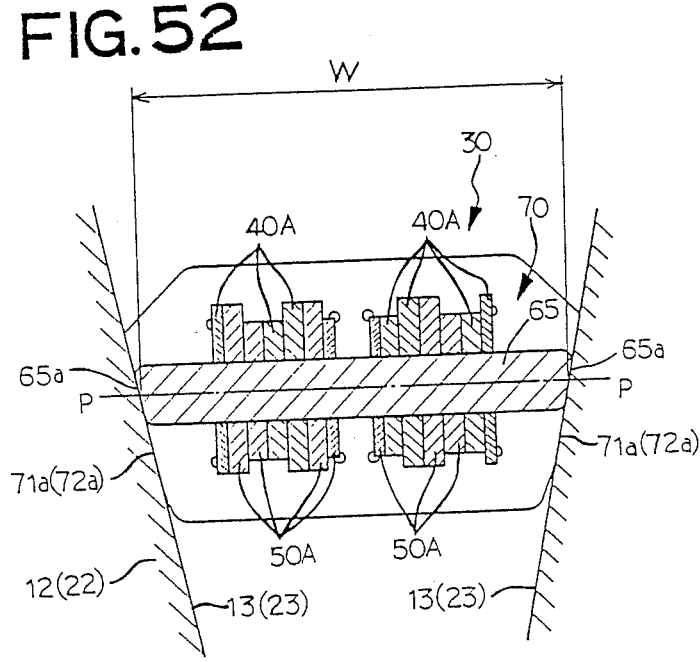
Figure 53:
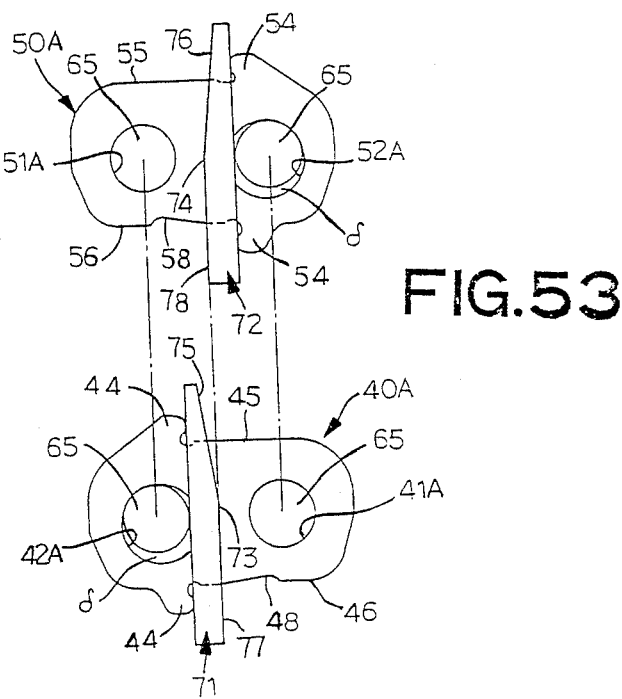
Figure 54:
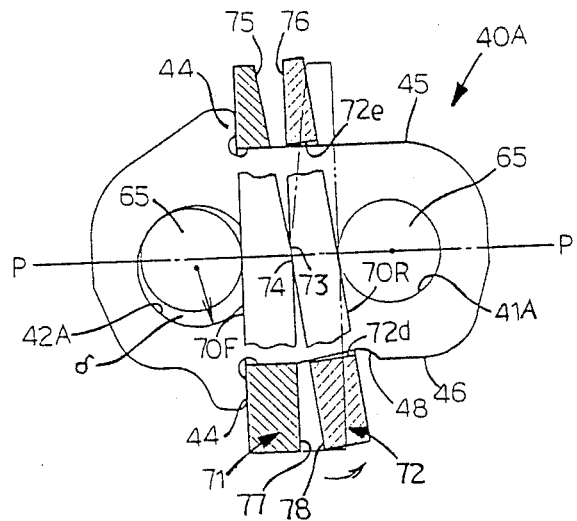

In the present embodiment, the rocker pin 61 and the block 72 are rotated as a unit, while the rocker pin 64 and the block 71 are rotated as a unit, as in the embodiment of FIGS. 1–10. Consequently, two sides of a polygon defined by the bending points of each portion of the chain belt 30 engaging the pulley 12, 22 consist of a straight line connecting a point of rolling contact between the rocker pins 61-1 and 62-1 of the link plate 40-1 and a point of rolling contact between the blocks 71-1 and 72-1, and a straight line connecting a point of rolling contact between the blocks 71-1 and 72-1 and a point of rolling contact between the rocker pins 63-1 and 64-1 of the link plate 50-1, as indicated in FIG. 48. Thus, the bending pitch p (FIG. 44) of the instant chain belt 30 is reduced to a half of that of the known chain belt 3 of FIGS. 22–25, whereby the noises due to the chain belt 30 are reduced.

Referring next to FIGS. 50–54, there is shown the eighth embodiment of the chain belt 30 of the invention. In the instant chain belt 30, the roller pins 65 are used for connecting the link plates 40A, 50A. Further, the leading front surface 70F of the block unit 70 is engageable with the roller pins 65, without being disturbed by the tabs 44, while the trailing surface 70R of the block unit 70 is engageable with the rocker pins 65, without being disturbed by the tabs 54. As in the embodiments of FIGS. 1–17 and 41–43, the link plates 40A, 50A have the round pin holes 41A, 42A, and 51A, 52A, respectively. The present embodiment provides the same advantage as the above-indicated preceding embodiments of FIGS. 1–17 and FIGS. 55–57 show the nineth embodiment of the invention. In the instant embodiment, too, the roller pins 5 are used to connect the link plates 40B, 50B, and the leading front surface 70F and trailing rear surface 70R of the block unit 70 are engageable with the roller pins 65, without being disturbed by the tabs 44, 54. As in the embodiments of FIGS. 18–20 and FIGS. 41–43, the pin holes 42B, 52B formed in one end portion of the link plates 40B, 50B have a larger diameter than the pin holes 41B, 51B formed in the other end portion of the link plates. The center of the pin holes 42B, 52B lies on the pitch line P—P, and the roller pins 65 are positioned concentrically with the pin holes 42B, 52B. The roller pins 65 are spaced away from the inner surface of the pin holes 42B, 52B, even while the link plates 40B, 50B are moved along the path of the pulley 12, 22. The present embodiment provides the same advantage as the preceding embodiments of FIGS. 18–20 and 41–43.

As indicated above, the bending pitch of the chain belt 30 according to the embodiments which have been described is reduced to a half of that of the known chain belt 3 of FIGS. 22–25. Accordingly, the variation of the tension of the chain belt 30 is reduced, and the resulting noises are reduced. To further reduce the peak of the noises having a given frequency which is generally determined by the bending pitch of the chain belt 30, it is desirable that the pin units 60 and/or the blocks 71, 72 have different lengths (perpendicular to the rotating direction of the belt), depending upon the positions of the pin units and/or the blocks in the rotating direction of the belt, such that the lengths are varied irregularly or at random in the rotating direction. This arrangement is effective to shape the waveform of the noises such that the waveform has a comparatively low peak and a comparatively wide frequency range, where the waveform represents a relation between the intensity and frequency of the noises.

In the first embodiment of FIGS. 1–10, fourth embodiment of FIGS. 28–35 and seventh embodiment of FIGS. 44–49, for example, some of the pairs of the rocker pin and the block (such as the block 72-1 and the rocker pin 61-1, and the block 71-1 and rocker pin 64-1) are selected at random over the entire length of the chain belt 30, and the lengths of the selected pairs are suitably reduced as compared with those of the remaining pairs.

Figure 58:
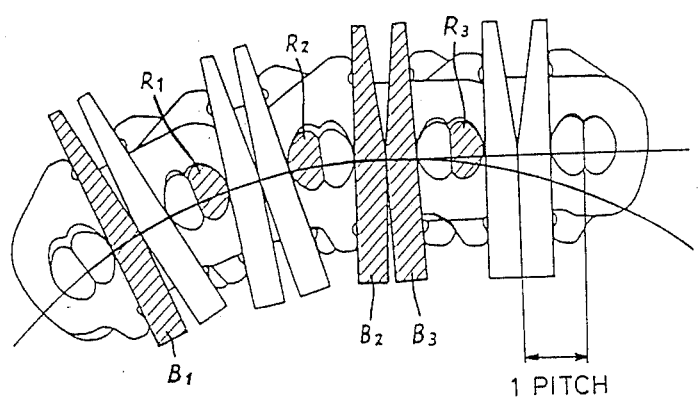
FIGS. 58, 59, 60 and 61 are views showing still further embodiments of the present invention.

The chain belt 30 shown in FIG. 58 is an example which incorporates the above arrangement, wherein the lengths of the blocks B1-B3 and the rocker pins R1-R3 which are hatched in the figure are smaller than the lengths of the non-hatched standard blocks and rocker pins. Namely, the block B1 and the pin R1, the block B2 and the pin R2, and the block B3 and the pin R3 are some of the special pairs which are selected at random over the entire length of the belt 30.

Figure 59:
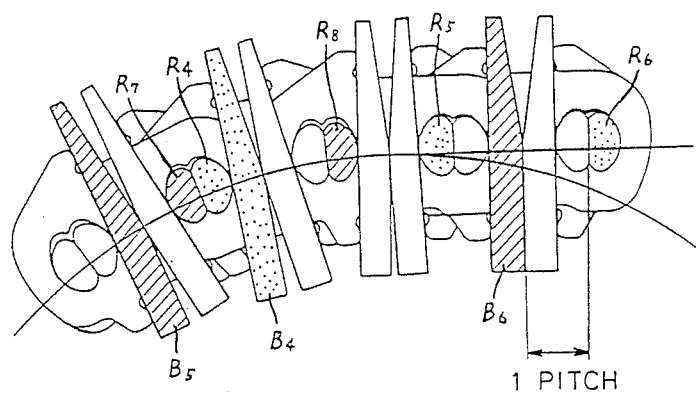
Figure 60:
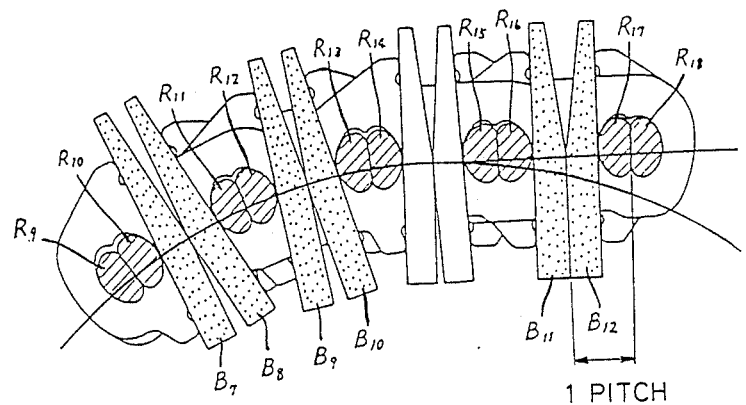

In the embodiments of FIGS. 59 and 60, the special blocks and rocker pins which have smaller lengths are not selected in pairs as in the embodiment of FIG. 59, but some of the blocks and some of the rocker pins are selected at random as the special blocks and the special rocker pins. That is, at least one of each selected pair of the block and the rocker pin has a length smaller than the standard length. In this case, the blocks and the rocker pins come into contact with the pulleys 12, 22, at different positions on the pulleys, whereby the noise waveform may be shaped to have a reduced peak and a broadened frequency range.

In the embodiment of FIG. 59, the special blocks and rocker pins have two different lengths. Namely, the dotted block B4 and dotted rocker pins R4-R6 have first reduced lengths, while the hatched blocks B5, B6 and hatched rocker pins R7, R8 have second reduced lengths. This arrangement permits the noise waveform to have a further reduced peak and a further broadened frequency range.

In the embodiment of FIG. 60, the pair of blocks between the adjacent rocker pins are selected as the special blocks which have a reduced length. These special pairs of blocks are selected at random over the entire length of the chain belt 30. In the instant example, a pair of blocks B7 and B8, a pair of blocks B9 and B10, and a pair of blocks B11 and B12 are selected as the special pairs of blocks. Further, the length of all the rocker pins is so small that the rocker pins do not substantially contact the pulleys 12, 22. Accordingly, the power transmission between the pulleys 12, 22 and the chain belt 30 is effected primarily by means of the blocks. However, the bending pitch of the portions of the belt 30 engaging the pulleys 12, 22 is still about a half of that of the known belt 3, and the bending angle formed by the adjacent sets of the link plates is accordingly reduced, whereby the noises due to the varying tension of the chain belt 30 can be attenuated according to the principle of the invention.

Figure 55:
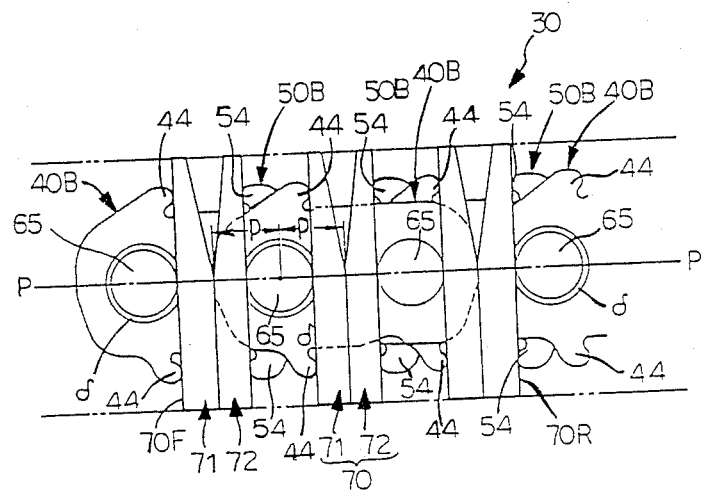
FIGS. 55, 56 and 57 are views relating to a ninth embodiment of the invention, corresponding to those of FIGS. 18, 19 and 20 of the third embodiment, respectively.
Figure 56:
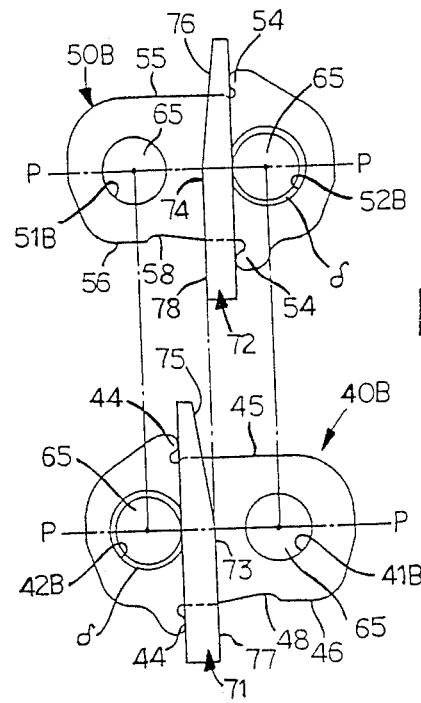
Figure 57:
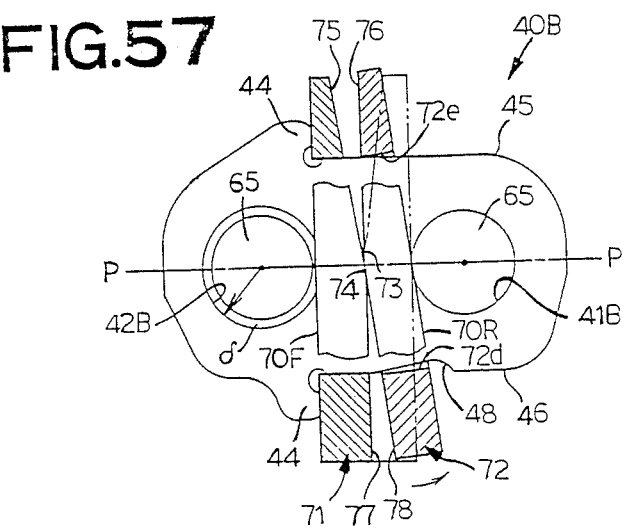

The above arrangements wherein the selected rocker pins 61-64 and/or blocks 71, 72 have different lengths depending upon the positions in the rotating direction of the chain belt 30 to reduce the peak of the noises are also applicable to the second embodiment of FIGS. 11-17, third embodiment of FIGS. 18-20, fifth embodiment of FIGS. 36-40, sixth embodiment of FIGS. 41-43, eighth embodiment of FIGS. 50-54 and nineth embodiment of FIGS. 55-57, as well as the first embodiment of FIGS. 1-10, fourth embodiment of FIGS. 28-35 and seventh embodiment of FIGS. 44-49. In summary, the peak of the noise waveform may be reduced while the frequency range of the noises may be broadened, by utilizing one of the following five arrangements:

(1) Some of the roller pins 65 are selected at random as the special pins, over the entire length of the chain belt 30.

(2) Some of the blocks 71, 72 are selected at random as the special blocks, over the entire length of the chain belt 30.

(3) Some of the pairs of the block and roller pin which are movable as a unit (such as the pair of the left roller pin 65 and the block 72, and the pair of the right roller pin 65 and the block 71, in the embodiments of FIGS. 17, 20, 40, 43, 54, 57) are selected at random as the special pairs, over the entire length of the chain block 30.

(4) The length of the roller pins 65 is determined to be so small that the pins 65 do not contact the pulleys 12, 22, and some of the pairs of the blocks (blocks 71, 72 in the embodiments of FIG. 17, FIG. 20, FIG. 40, FIG. 43, FIG. 54 and FIG. 57) sandwiched between the roller pins 65 are selected at random as the special pairs, over the entire length of the chain belt 30.

(5) Some of the roller pins 65, blocks 71, and blocks 72 are selected at random as the special pins or blocks, over the entire length of the chain belt 30.

In either of the above five different arrangements, the lengths of the special pins and blocks which are smaller than the standard lengths may differ in two or more steps.

To further reduce the peak of the noises, some of the blocks 71 or blocks 72 are selected at random over the length of the chain belt 30, so that the selected blocks 71 or 72 have a reduced taper angle $\theta$ (formed by the tapered surface 75 or 76) as compared to the taper angle of the standard blocks 71, 72.

Figure 61:
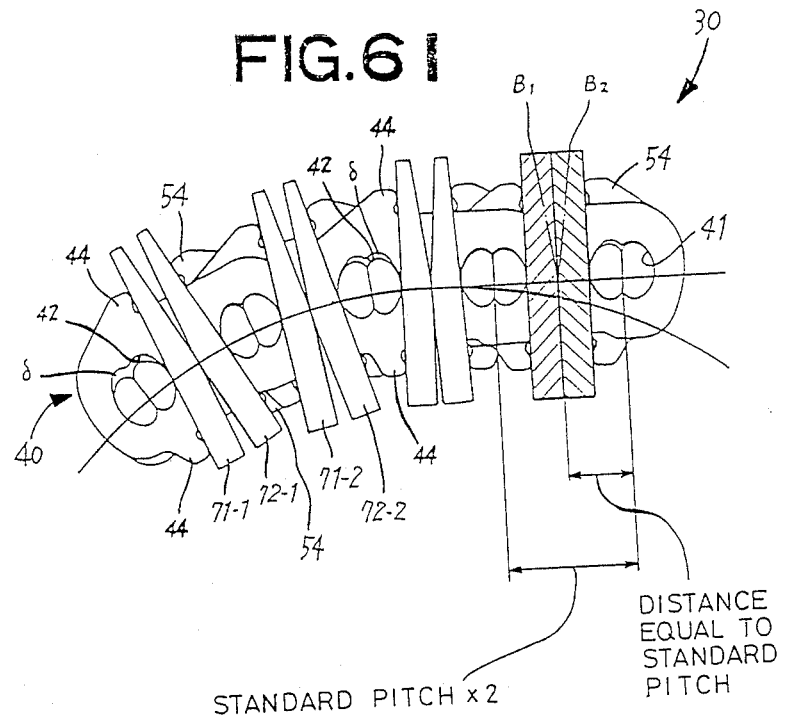

Described more specifically in connection with the first, fourth and seventh embodiments of FIGS. 1-10, FIGS. 8-35 and FIGS. 44-49, by way of example, some of the pairs of the blocks sandwiched between the pin units 60 (e.g., pair of the block 71-1 and 72-1, and pair of the blocks 71-2 and 72-2) are selected at random as the special pairs over the entire length of the chain belt 30, and the taper angle $\theta$ of the blocks of the selected special pairs is made smaller than that of the other blocks. FIG. 61 shows an example of this arrangement, wherein a pair of hatched blocks B1 and B2 is selected as the special pair wherein the taper angle $\theta$ of the blocks is zero. In the figure, the non-hatched blocks are the standard blocks. The other special blocks B1, B2 are selected at random over the entire length of the chain belt 30.

In the example of FIG. 61, the bending pitch of the portions of the chain belt 30 which include the special pairs of blocks B1, B2 having the taper angle $\theta$ of zero is twice as large as the binding pitch of the other portions (is equal to the bending pitch of the known chain belt 3). Therefore, the use of the special pairs of blocks B1, B2 results in reducing the peak of the noises. While both of the blocks B1, B2 of the block unit 70 are modified such that the taper angle $\theta$ is zero, it is possible that only one of the blocks B1, B2 is modified. Further, the taper angle $\theta$ of the modified blocks is not necessarily zero, but may be smaller than the angle of the standard blocks. It is also possible that the selected special pairs of blocks have different taper angles $\theta$, or the blocks B1 and B2 of the selected special pairs may have different taper angles.

In the first through nineth embodiments, it is possible that the amount of the clearance $\delta$ formed between the inner surface of the pin holes 42 or 52 (pin holes 52 not shown in FIG. 61) and the pin units 60 is changed in a range between zero and the standard amount (clearance amount provided in the standard pin holes 42, 52), depending upon the positions of the pin holes in the rotating direction of the chain belt 30. This arrangement is also effective to reduce the peak of the noises.

It is also possible that the same chain belt 30 have both the special pin holes 42, 54 having a reduced amount of clearance $\delta$, and the special blocks B1, B2 having a reduced or zeroed taper angle $\theta$, in order to further reduce the noises of the belt.

While the present invention has been described in its presently preferred embodiments with a certain degree of particularity, it is to be understood that the invention is not limited to the details of the illustrated embodiments, but may be embodied with various changes, modifications and improvements, which may occur to those skilled in the art, without departing from the spirit and scope of the invention defined in the following claims. For example, the first pivot means of the belt 30 which include the pin holes and pins, and the second pivot means which include the blocks may be modified as needed.

What is claimed is:

1. A power transmission endless chain belt connecting a pair of pulleys each having an outer groove, comprising:

an endless belt body including multiple sets of link plates each set consisting of a plurality of link plates which are arranged in parallel with each other in a transverse direction perpendicular to a rotating direction of the chain belt, each of said plurality of link plates of said each set having a pair of pin holes, said belt body further including a multiplicity of pins which are inserted into said pin holes of said multiple sets of link plates such that the link plates of one set are pivotally connected to the link plates of the adjacent sets, whereby said multiple sets of link plates are flexibly looped in said rotating direction;

multiple pairs of blocks each pair having opposed mutually rolling surfaces, each of said pair of blocks having an aperture through which the link plates of a corresponding one of said multiple sets extend;

said multiplicity of pins constituting first pivot means which define a plurality of first bending points of the chain belt;

one of said pair of pin holes formed in said each link plate having a larger size than the other pin hole, and cooperating with the corresponding one of said multiplicity of pins, to define a clearance therebetween;

the link plates of said each set are arranged such that each of said multiplicity of pins extends through said one of said pair of pin holes in at least one of the link plates of said each set, and the other of said pair of pin holes in the remainder of the link plates of said each set;

said multiple pairs of blocks constituting second pivot means such that said opposed mutually rolling surfaces define a plurality of second bending points of the chain belt, each of said second bending points being located between adjacent ones of said first bending points, whereby a bending pitch of said chain belt is equal to a distance between each of said first bending point and said each second bending point.

2. A power transmission endless chain belt according to claim 1, wherein said each link plate has a recess formed in an inner surface thereof on an inner side of said endless belt body, such that said recess permits one of the corresponding pair of blocks to be inclined in a plane perpendicular to a plane of said one block when said corresponding pair of blocks engage said outer grooves of said pair of pulleys.

3. A power transmission endless chain belt according to claim 1, wherein said multiplicity of pins consist of multiple pairs of rocker pins each pair having mutually rolling surfaces.

4. A power transmission endless chain belt according to claim 3, wherein radii of curvature of said opposed mutually rolling surfaces of said each pair of blocks are equal to radii of curvature of said mutually rolling surfaces of said each pair of rocker pins.

5. A power transmission endless chain belt according to claim 1, wherein said multiplicity of pins consist of roller pins.

6. A power transmission endless chain belt according to claim 1, wherein said multiplicity of pins have a length determined such that opposite ends of the pins are engageable with opposed inner surfaces of said outer grooves of said pulleys, each of said opposed ends being formed into a part-spherical shape.

7. A power transmission endless chain belt according to claim 1, wherein at least one of said each pair of blocks has a tapered surface which extends from the corresponding one of said mutually rolling surfaces outwardly of said endless belt body, and a vertical surface which extends from said corresponding rolling surface inwardly of said endless belt body, said vertical surface being perpendicular to said rotating direction of the belt.

8. A power transmission endless chain belt according to claim 7, wherein each of said each pair of blocks has said vertical surface, the vertical surfaces of said each pair of blocks being held in contact with each other while said blocks are located in a straight segment of the chain belt.

9. A power transmission endless chain belt according to claim 7, wherein each of said each pair of blocks has said tapered surface, angles of said tapered surfaces of said each pair of blocks being determined such that said tapered surfaces do not contact with each other even when a portion of said chain belt which includes said each pair of blocks is curved along said pulleys, with a minimum radius of curvature of the chain belt.

10. A power transmission endless chain belt according to claim 1, wherein said opposed mutually rolling surfaces of said each pair of blocks have radii of curvature located on a pitch line of the chain belt which is defined by said first and second pluralities of bending points.

11. A power transmission endless chain belt according to claim 1, wherein each of said each pair of blocks includes a partition wall formed in a longitudinally intermediate portion thereof such that said aperture is divided into two apertures which are spaced apart from each other in a longitudinal direction of said each block parallel to said transverse direction of the chain belt, said each set of link plates consisting of two groups each consisting of an odd number of link plates, one of the link plates of each of said two groups which is adjacent to said partition wall, and an outermost one of said link plates of said each group having a thickness which is equal to a half of that of the remainder of the link plates of said each group.

12. A power transmission endless chain belt according to claim 1, wherein each of the link plates of said each set has a tab formed at one of opposite longitudinal end portions thereof, the link plates of said each set extending through said aperture of the corresponding pair of blocks, alternately in opposite directions parallel to said rotating direction of the chain belt, such that said corresponding pair of blocks are sandwiched by and between said tabs of the link plates of said each set, so as to hold said corresponding pair of blocks spaced away from the corresponding pins.

13. A power transmission endless chain belt according to claim 12, wherein an inner surface of one of said pair of pin holes which is formed nearer to said tab is in contact with the corresponding pin while the chain belt is transmissing power between said pair of pulleys.

14. A power transmission endless chain belt according to claim 12, wherein an inner surface of one of said pair of pin holes which is formed nearer to said tab is spaced away from the corresponding pin while the chain belt is transmitting power between said pair of pulleys.

15. A power transmission endless chain belt according to claim 1, wherein said each pair of blocks corresponding to said each set of link plates are held in contact with and between the pins which extend through said pair of pin holes formed in the link plates of said each set.

16. A power transmission endless chain belt according to claim 15, wherein an inner surface of one of said pair of pin holes is in contact with the corresponding pin while the chain belt is transmitting power between said pair of pulleys.

17. A power transmission endless chain belt according to claim 15, wherein an inner surface of one of said pair of pin holes is spaced away from the corresponding pin while the chain belt is transmitting power between said pair of pulleys.

18. A power transmission endless chain belt according to claim 1, wherein each of the link plates of said each set has a tab formed at one of opposite longitudinal end portions thereof, the pair of blocks corresponding to said each set of link plates being sandwiched by and between the tabs of the link plates such that the pins which extend through said apertures in said each set of link plates are abuttable on said pair of blocks.

19. A power transmission endless chain belt according to claim 18, wherein an inner surface of one of said pair of pin holes which is nearer to said tab is in contact with the corresponding pin while the chain belt is transmitting power between said pair of pulleys.

20. A power transmission endless chain belt according to claim 18, wherein an inner surface of one of said pair of pin holes which is nearer to said tab is spaced away from the corresponding pin while the chain belt is transmitting power between said pair of pulleys.

21. A power transmission endless chain belt according to claim 1, wherein some of said multiplicity of pins and/or some of the blocks of said multiple pairs of blocks are selected at random as special pins and/or special blocks, over an entire length of the chain belt, said special pins and/or said special blocks having lengths smaller than those of the remainder of said multiplicity of pins and the remainder of said multiple pair of blocks.

22. A power transmission endless chain belt according to claim 1, wherein some of the pin holes of said multiple sets of link plates are selected at random as special pin holes, over an entire length of the chain belt, said special pin holes having a clearance with respect to the corresponding pins, said clearance of said special pin holes being different from that of the remainder of said pin holes of the multiple sets of link plates.

23. A power transmission endless chain belt according to claim 1, wherein said each pair of blocks has a tapered surface, and some of said multiple pairs of blocks are selected at random as special pairs of blocks, over an entire length of the chain belt, an angle of said tapered surface of said special pairs of blocks being different from that of the remainder of said multiple pairs of blocks.

24. A power transmission endless chain belt according to claim 23, wherein some of the pin holes of said multiple sets of link plates are selected at random as special pin holes, over an entire length of the chain belt, said special pin holes having a clearance with respect to the corresponding pins, said clearance of said special pin holes being different from that of the remainder of said pin holes of the multiple sets of link plates.

* * * * *